United States Patent
Okazaki

(10) Patent No.: US 8,185,243 B2
(45) Date of Patent: May 22, 2012

(54) ROBOT, CONTROL DEVICE FOR ROBOT ARM AND CONTROL PROGRAM FOR ROBOT ARM

(75) Inventor: Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/109,326

(22) Filed: May 17, 2011

(65) Prior Publication Data

US 2011/0218676 A1    Sep. 8, 2011

Related U.S. Application Data

(63) Continuation of application No. PCT/JP2010/001949, filed on Mar. 18, 2010.

(30) Foreign Application Priority Data

Jul. 2, 2009    (JP) ................................. 2009-157700

(51) Int. Cl.
    *G05B 15/00*    (2006.01)
    *G05B 19/00*    (2006.01)
    *G05B 19/04*    (2006.01)
    *G05B 19/08*    (2006.01)

(52) U.S. Cl. ........ 700/260; 700/254; 700/258; 700/261; 901/2; 901/9; 901/11; 901/14; 901/15; 901/27; 901/28; 901/29

(58) Field of Classification Search .................... None
See application file for complete search history.

(56) References Cited

U.S. PATENT DOCUMENTS

| | | | | |
|---|---|---|---|---|
| 4,909,869 A | * | 3/1990 | Sakamoto et al. | 156/64 |
| 5,765,975 A | * | 6/1998 | Hoffmann et al. | 409/138 |
| 6,519,860 B1 | * | 2/2003 | Bieg et al. | 33/503 |
| 7,748,593 B2 | * | 7/2010 | Sayama et al. | 228/2.1 |
| 2005/0281660 A1 | * | 12/2005 | Nihei et al. | 414/735 |
| 2006/0241414 A1 | * | 10/2006 | Nowlin et al. | 600/431 |
| 2010/0200554 A1 | * | 8/2010 | Uchida et al. | 219/137 R |

FOREIGN PATENT DOCUMENTS

| | | |
|---|---|---|
| JP | 61-230887 | 10/1986 |
| JP | 4-226881 | 8/1992 |
| JP | 5-84685 | 4/1993 |
| JP | 5-329787 | 12/1993 |
| JP | 6-99385 | 4/1994 |
| JP | 6-344283 | 12/1994 |
| JP | 9-85671 | 3/1997 |
| JP | 2009-125886 | 6/2009 |

OTHER PUBLICATIONS

International Search Report issued May 25, 2010 in International (PCT) Application No. PCT/JP2010/001949.

International Preliminary Report on Patentability issued Jan. 5, 2012 in International (PCT) Application No. PCT/JP2010/001949.

* cited by examiner

*Primary Examiner* — Khoi Tran
*Assistant Examiner* — Bao Long T Nguyen
(74) *Attorney, Agent, or Firm* — Wenderoth, Lind & Ponack, L.L.P.

(57) ABSTRACT

A robot arm, which is driven by an elastic body actuator and has a plurality of joints, is provided with an arm-end supporting member that supports the robot arm when made in contact with a supporting surface that is placed on an arm-end portion of the robot arm and a control unit that controls a force by which the arm-end supporting member and the supporting surface are made in contact with each other, and further controls a position and orientation of the arm-end portion of the robot arm.

14 Claims, 28 Drawing Sheets

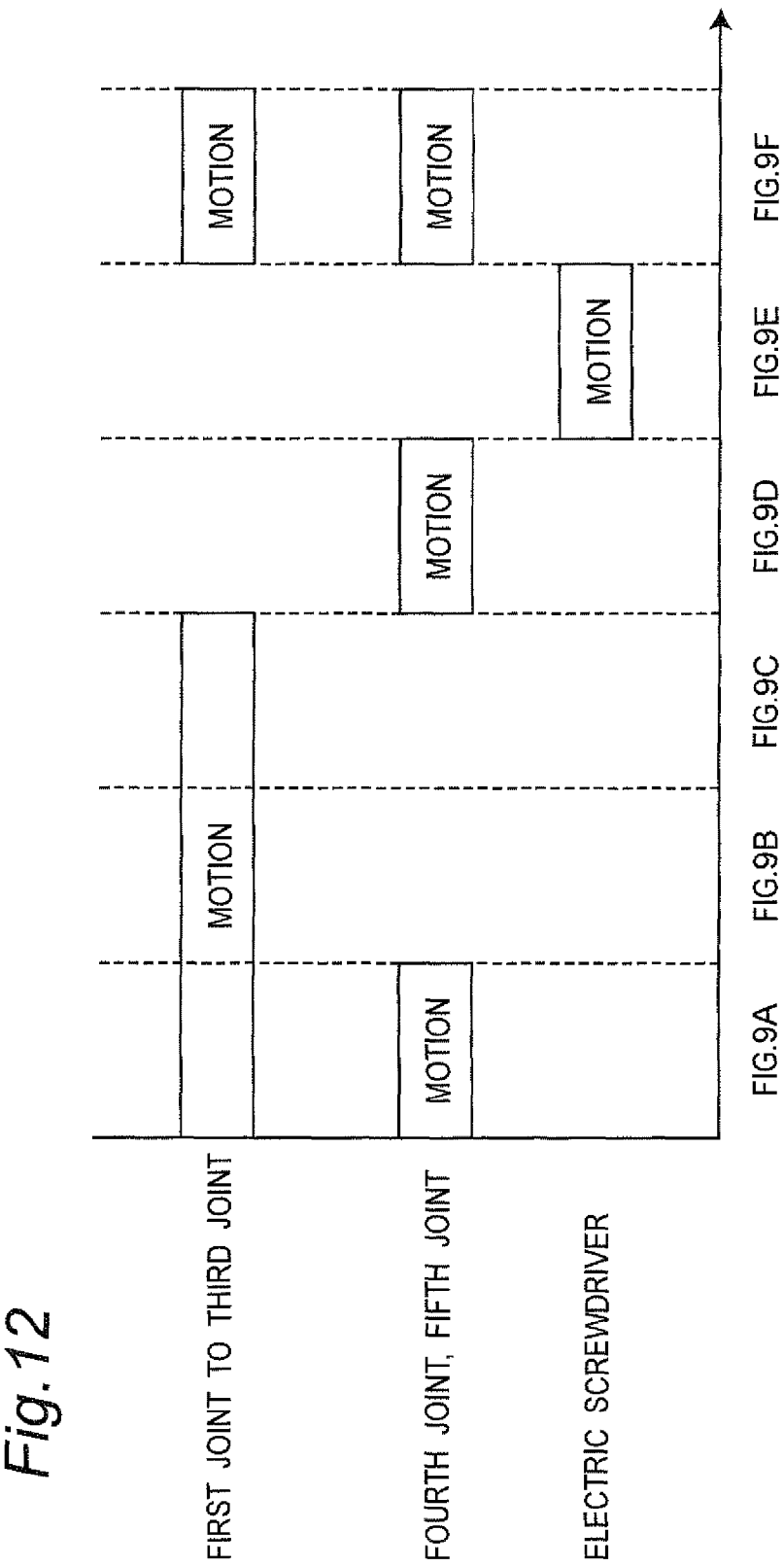

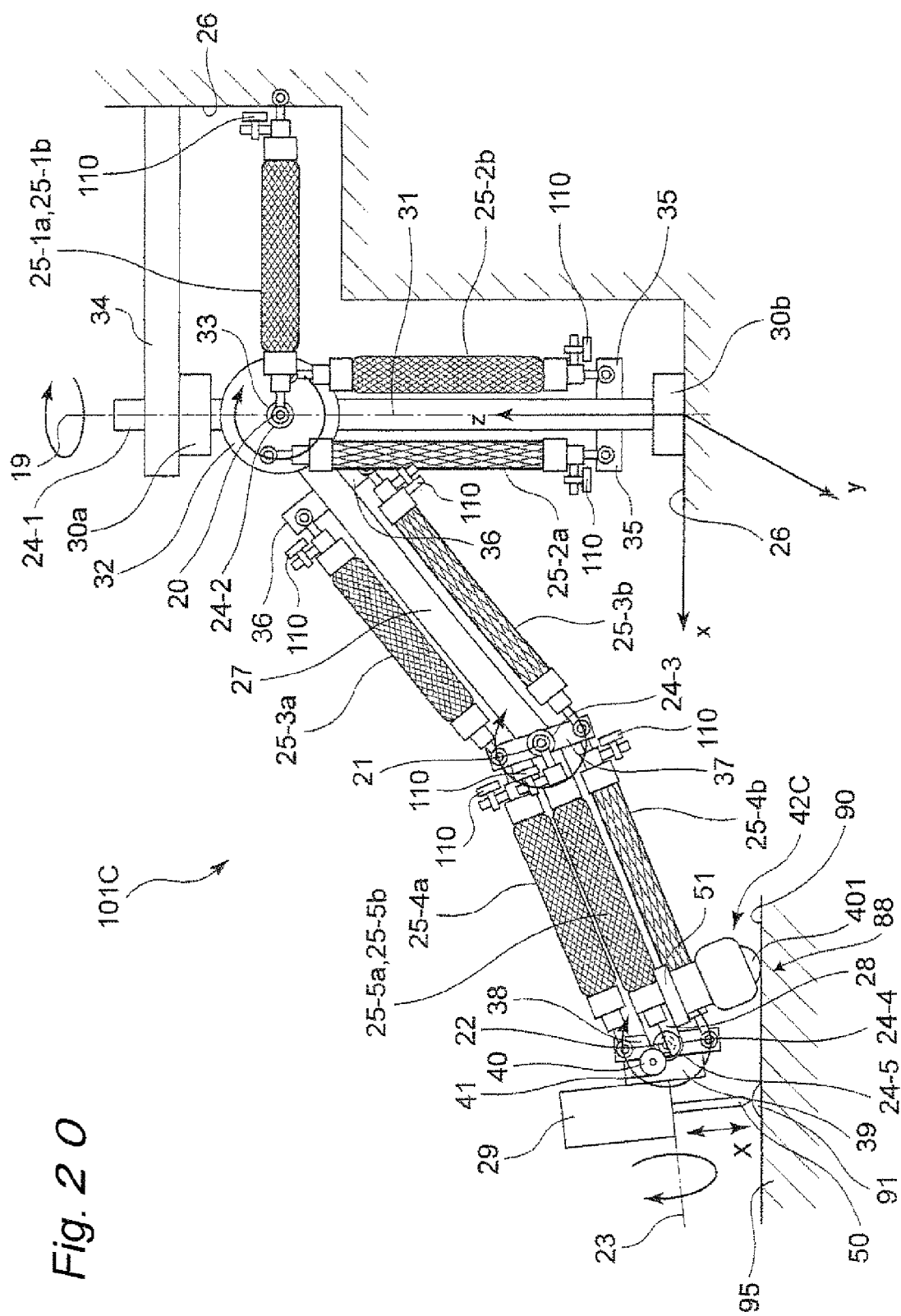

ROBOT, CONTROL DEVICE FOR ROBOT ARM AND CONTROL PROGRAM FOR ROBOT ARM

This is a continuation application of International Application No. PCT/JP2010/001949, filed Mar. 18, 2010.

BACKGROUND OF THE INVENTION

The present invention relates to improvements of a mechanical technique for a robot arm and a control technique for a robot arm, and also relates to a robot, a control device for a robot arm, and a control program for a robot arm.

In recent years, developments of home-use robots such as pet robots have been vigorously carried out, and it is expected that in the future, more practical home-use robots, such as house-keeping support robots or the like, will be put into practical use. Since the home-use robots need to enter the home and coexist with human beings, the robots are inevitably physically made in contact with the human beings so that they need to be flexible from the viewpoint of safety.

Moreover, in factories, an attempt has been made to automate an assembling task, a recycling scrapping task or the like; however, in the case where the contents of the task are complicated or there are various environments, such as a state in which the use of a jig is difficult because of a small quantity of products with a large number of product types, and the position of the corresponding part is indefinite, conventional industrial robots fails to provide a sufficient solution.

In contrast, there is proposed a task assistant robot in which the human being mainly carries out a task, while the robot assists the human being, so that the efficiency of the task is improved. Since the robot that assists the human being is operated near a person, it needs to be flexible from the viewpoint of safety.

As a flexible robot, a pneumatic arm that uses a pneumatic actuator as a driving device has been developed. The pneumatic arm, which utilizes a compressive characteristic of air, has flexibility from a mechanical point of view, and is originally safe in comparison with a system that provides flexibility from the controlling motions.

However, the pneumatic arm tends to easily cause vibrations because of its flexibility, and makes it difficult to provide high precision in determining the position of the arm-end upon carrying out a high-speed motion, and in particular, makes it difficult to be applied to a task required for high precision, such as an assembling task in a factory.

In the attempt to improve the position-determining precision of the arm-end, as a related art, Patent Document 1 proposes a technique in which, as shown in FIG. 27, an end effector 201, provided with position and orientation guides 204a, 204b, and 204c having flexibility, is attached to the arm-end of the robot arm (not shown) so that the part is held by the end effector 201, while the position of the target object is detected, with the part and the target object being held in a non-contact state, and the center axes thereof are made coincident with each other; thus, engaging processes or screw-tightening processes are carried out with high controllability.

Moreover, Patent Document 2 proposes a technique in which at least two joints on the base end side are prepared as flexible movable joints, and by placing an elbow frame on a table, the position or orientation of a hand can be ensured with high precision.

Furthermore, Patent Document 3 proposes a technique in which, by making an end effector in contact with a desired task in a force control mode, a precise positioning process is carried out so that positional data can be obtained.

Patent Document 1: Japanese Unexamined Patent Publication No. H5-84685
Patent Document 2: Japanese Unexamined Patent Publication No. 2009-125886
Patent Document 3: Japanese Unexamined Patent Publication No. H5-329787

However, the structure of Patent Document 1 fails to exert its effects, unless the target object is a convex-shaped object, such as a bolt, that can be enclosed by position and orientation guides 204a, 204b, and 204c, and the technique is specialized to a specific task, for example, failing to deal with a screw that is inserted into a counter sunk hole, and is not applicable to a general technique for use in improving the position-determining precision of a flexible robot arm, such as a pneumatic arm.

Moreover, the structure of Patent Document 2 can improve the precision of the arm-end position and orientation by placing the robot arm elbow on the table so that the robot arm is stabilized; however, this technique fails to be applied as a technique for use in improving the precision at high-speed motions, such as motions in which, after the arm-end has been shifted at a high speed, a decelerating process is abruptly carried out to conduct a positioning process.

Since the structure of Patent Document 3 carries out a force controlling motion with the end effector being made in contact with a work, this is not used as a technique by which, with an object being grabbed, a task is carried out by changing the position or orientation of the object.

In view of the above conventional issues, an object of the present invention is to provide a robot that is flexible with high safety, and can control the position and orientation of an end effector or a grabbed object with high precision, even in the case of a high-speed motion, a control device for a robot arm, and a control program for the robot arm.

SUMMARY OF THE INVENTION

In order to achieve the above object, the present invention has the following structures.

According to a first aspect of the present invention, there is provided a robot comprising:
a robot arm that is driven by an elastic body actuator and has a plurality of joints;
an arm-end supporting member that is placed near a wrist portion of the robot arm on a base side from the wrist portion, and supports the arm-end portion of the robot arm by making in contact with a supporting surface of the robot arm; and
a control unit that controls a position and an orientation of the arm-end portion of the robot arm and controls a force by which the arm-end supporting member and the supporting surface are made in contact with each other, wherein
the control unit
(i) controls the force in a manner so as to press the arm-end supporting member onto the supporting surface to stop the position of the arm-end portion of the robot arm, and then controls the orientation of the arm-end portion, and
(ii) carries out a force control by using a pressing force that is smaller than the force controlled upon moving the orientation of the arm-end portion so that the position of the arm-end portion is shifted.

According to a ninth aspect of the present invention, there is provided a robot comprising:
a robot arm that is driven by an elastic body actuator and has a plurality of joints;
an arm-end supporting member that is placed near a wrist portion of the robot arm on a base side from the wrist portion, and supports the arm-end portion of the robot arm by making in contact with a supporting surface of the robot arm; and a control unit that controls a force by which the arm-end supporting member and the supporting surface are made in contact with each other, and further controls a position and an orientation of the arm-end portion of the robot arm, wherein the control unit controls to decelerate an arm-end velocity of the robot arm by utilizing friction generated by the contact between the arm-end supporting member and the supporting surface.

According to an 11th aspect of the present invention, there is provided a control device for a robot arm, which controls a robot arm that is driven by an elastic body actuator and has a plurality of joints, by making an arm-end supporting member that is placed near a wrist portion of the robot arm on a base side from the wrist portion in contact with a supporting surface so that the arm-end portion of the robot arm is supported, wherein the control device controls a position and an orientation of the arm-end portion of the robot arm and controls a force by which the arm-end supporting member and the supporting surface are made in contact with each other, (i) controls the force in a manner so as to press the arm-end supporting member onto the supporting surface to stop the position of the arm-end portion of the robot arm, and then controls the orientation of the arm-end portion, and (ii) carries out a force control by using a pressing force that is smaller than the force controlled upon moving the orientation of the arm-end portion so that the position of the arm-end portion is shifted.

According to a 12th aspect of the present invention, there is provided a control program for a robot arm, which controls a robot arm that is driven by an elastic body actuator and has a plurality of joints, by making an arm-end supporting member that is placed near a wrist portion of the robot arm on a base side from the wrist portion in contact with a supporting surface so that the arm-end portion of the robot arm is supported, the control program causing a computer to:

controlling a position and an orientation of the arm-end portion of the robot arm, and controlling a force by which the arm-end supporting member and the supporting surface are made in contact with each other, (i) controlling the force in a manner so as to press the arm-end supporting member onto the supporting surface to stop the position of the arm-end portion of the robot arm, and then controlling the orientation of the arm-end portion, and (ii) carrying out a force control by using a pressing force that is smaller than the force controlled upon moving the orientation of the arm-end portion so that the position of the arm-end portion is shifted.

According to the present invention, the arm-end supporting member is placed near the wrist portion of the robot arm on the base side from the wrist portion, and the control unit is provided so that, with the arm-end portion of the robot arm being mechanically supported by the arm-end supporting member, the force controlling motion is carried out by the control unit in a manner so as to press the arm-end supporting member onto the supporting surface so that the position of the arm-end portion can be stabilized.

Based upon the above effects, even in the case of a robot arm that is driven by an elastic body actuator such as a pneumatic artificial muscle, it is possible to carry out a high-speed motion with high precision, and also to provide a robot arm that is flexible and originally has high safety with high precision, a control device for the robot arm, and a control program for the robot arm.

BRIEF DESCRIPTION OF THE DRAWINGS

These and other aspects and features of the present invention will become clear from the following description taken in conjunction with the preferred embodiments thereof with reference to the accompanying drawings, in which:

FIG. 12 is a timing chart showing motions of the robot arm according to the first embodiment of the present invention;

FIG. 20 is a view showing a structure of a robot arm according to a fourth embodiment of the present invention;

DETAILED DESCRIPTION OF THE PREFERRED EMBODIMENTS

Figure 1:
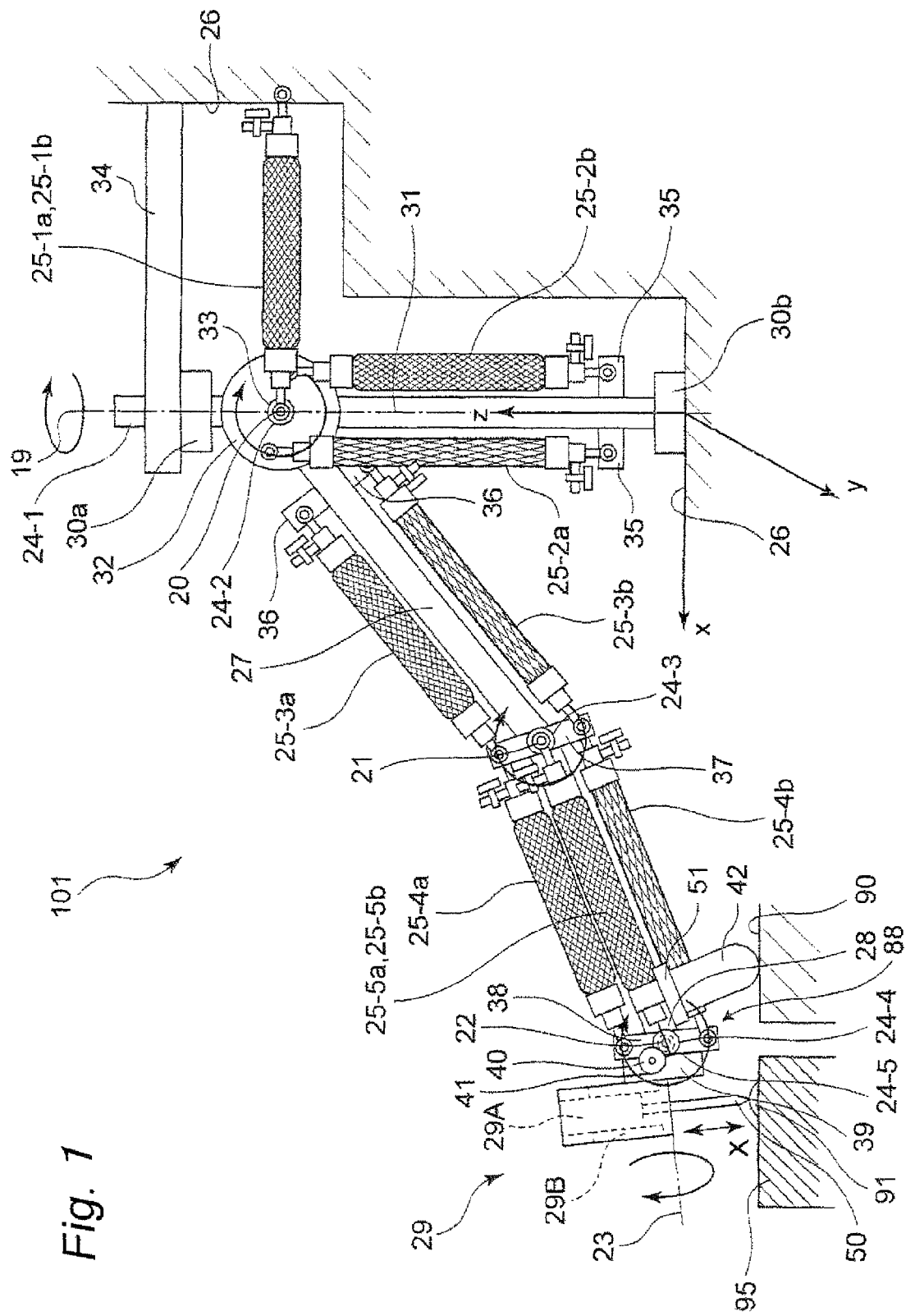
FIG. 1 is a view showing a structure of a robot arm according to a first embodiment of the present invention.

Before the description of the present invention proceeds, it is to be noted that like parts are designated by like reference numerals throughout the accompanying drawings.

Prior to the detailed description of embodiments of the present invention based upon the drawings, various aspects for the present invention will be explained.

According to a first aspect of the present invention, there is provided a robot comprising:

a robot arm that is driven by an elastic body actuator and has a plurality of joints;

an arm-end supporting member that is placed near a wrist portion of the robot arm on a base side from the wrist portion, and supports the arm-end portion of the robot arm when made in contact with a supporting surface of the robot arm; and a control unit that controls a force by which the arm-end supporting member and the supporting surface are made in contact with each other, and further controls a position and an orientation of the arm-end portion of the robot arm.

According to a second aspect of the present invention, there is provided the robot according to the first aspect, wherein the arm-end supporting member has at least two supporting legs that are expandable.

According to a third aspect of the present invention, there is provided the robot according to the first aspect, wherein the arm-end supporting member is formed by an elastic sucker capable of being sucked or suction-released to and from the supporting surface by an air pressure, with friction between the sucker and the supporting surface being controllable.

According to a fourth aspect of the present invention, there is provided the robot according to the first aspect, wherein the arm-end supporting member is formed by an electromagnet capable of being sucked or suction-released to and from the supporting surface by a magnetic force, with friction between the electromagnet and the supporting surface being controlled.

According to a fifth aspect of the present invention, there is provided the robot according to the first aspect, wherein the arm-end supporting member is formed by a ball caster with a brake, with friction between the ball caster and the supporting surface being controlled.

According to a sixth aspect of the present invention, there is provided the robot according to the first aspect, wherein the arm-end supporting member is formed by a wheel with a brake, with friction between the wheel and the supporting surface being controlled separately depending on directions.

According to a seventh aspect of the present invention, there is provided the robot according to the first aspect, wherein the robot arm has three or more joints, and the arm-end supporting member is attached to a link of a second joint or thereafter from a fixed portion of the robot arm.

According to an eighth aspect of the present invention, there is provided the robot according to the seventh aspect, wherein the robot arm is further provided with a joint on the arm-end side from the position at which the arm-end supporting member is attached, with the joint having a degree of freedom that determines the orientation of the arm-end portion.

According to a ninth aspect of the present invention, there is provided the robot according to the first aspect, wherein the control unit controls to decelerate an arm-end velocity of the robot arm by utilizing friction generated by the contact between the arm-end supporting member and the supporting surface.

According to a tenth aspect of the present invention, there is provided the robot according to any one of the first to ninth aspects, wherein, after supporting the arm-end portion of the robot arm by making the arm-end supporting member in contact with the supporting surface of the robot arm, the control unit controls the position and the orientation of the arm-end portion of the robot arm.

According to an 11th aspect of the present invention, there is provided a control device for a robot arm, which controls a robot arm that is driven by an elastic body actuator and has a plurality of joints, by making an arm-end supporting member that is placed near a wrist portion of the robot arm on a base side from the wrist portion in contact with a supporting surface so that the arm-end portion of the robot arm is supported, wherein the control device controls a force by which the arm-end supporting member and the supporting surface are made in contact with each other, and controls a position and an orientation of the arm-end portion of the robot arm.

According to a 12th aspect of the present invention, there is provided a control program for a robot arm, which controls a robot arm that is driven by an elastic body actuator and has a plurality of joints, by making an arm-end supporting member that is placed near a wrist portion of the robot arm on a base side from the wrist portion in contact with a supporting surface so that the arm-end portion of the robot arm is supported, the control program causing a computer to:

controlling a force by which the arm-end supporting member and the supporting surface are made in contact with each other, and controlling a position and an orientation of the arm-end portion of the robot arm.

In the following, a detailed description will be given of embodiments of the present invention with reference to the drawings.

First Embodiment

FIG. 1 is a general view showing a structure of a robot 100 according to a first embodiment of the present invention. The robot 100 is provided with a robot arm 101 according to the first embodiment of the present invention, and a control unit (control device) 109 to be described later, which controls motions of the robot arm 101.

The robot arm 101 according to the first embodiment of the present invention includes a first joint axis (axis of a first joint 71) 19 that is allowed to rotate forwardly/reversely within a plane formed in a lateral direction, along an axis in a longitudinal direction, relative to a fixed wall (fixed unit) 26, a second joint axis (axis of a second joint 72) 20 that is allowed to rotate forwardly/reversely within a plane formed in the longitudinal direction, a third joint axis (axis of a third joint 73) 21 that is allowed to rotate forwardly/reversely within a plane formed in the longitudinal direction between a first arm 27 and a second arm 28, a fourth joint axis (axis of a fourth joint 74, in other words, a rotation axis of a wrist portion 88 of the robot arm) 22 that is allowed to rotate forwardly/reversely within a plane formed in the longitudinal direction between the second arm 28 and an electric screwdriver 29 serving as one example of an end effector, and a fifth joint axis (axis of a fifth joint 75) 23 that is allowed to rotate forwardly/reversely within a plane perpendicular to the fourth joint axis 22, between the second arm 28 and the electric screwdriver 29 serving as one example of the end effector.

In the first joint axis 19, a round supporting member 32 is coupled to a rotation shaft 31 so as to freely rotate thereon, whose upper and lower ends are supported by bearings 30a and 30b in the longitudinal direction so as to freely rotate thereon, and one end of each of an elastic body actuator 25-1a and an elastic body actuator 25-1b is coupled to the fixed wall 26, with the other end being coupled to a supporting shaft 33 of each of the round supporting members 32. Thus, by antagonistic driving motions of the elastic body actuator 25-1a and the elastic body actuator 25-1b, the first arm 27, the second arm 28, and the electric screwdriver 29 serving as one example of the end effector of the robot arm 101 are allowed to forwardly/reversely rotate integrally, within a plane formed in the lateral direction around a Z-axis corresponding to the longitudinal axis of the first joint axis 19. Note that, the bearing 30a on the upper side is supported on the fixed wall 26 by a supporting rod 34.

In the second joint axis 20, between the round supporting member 32 secured to the upper end of the rotation shaft 31 and a supporting member 35 secured to the proximity of the lower end on the fixed wall 26 side of the rotation shaft 31 in a manner so as to be orthogonal to the longitudinal direction of the rotation shaft 31, elastic body actuators 25-2a and 25-2b are coupled to each other so that, by antagonistic driving motions of the elastic body actuators 25-2a and 25-2b, the first arm 27, the second arm 28, and the electric screwdriver 29 serving as one example of the end effector of the robot arm 101 are allowed to forwardly/reversely rotate integrally, within a plane formed in the longitudinal direction around a lateral axis of the supporting shaft of the second joint axis 20.

In the third joint axis 21, near the first arm 27 on the round supporting member 32 side one end of which is secured to the round supporting member 32, a supporting member 36 is secured in a manner so as to be orthogonal to the longitudinal direction of the first arm 27, and to the tip end side of the first arm 27, a supporting member 37, which is secured to one end of the second arm 28 in a manner so as to be orthogonal to the longitudinal direction of the second arm 28, is coupled so as to rotate thereon. Between the supporting member 36 of the first arm 27 and the supporting member 37 secured to one end of the second arm, elastic body actuators 25-3a and 25-3b are coupled to each other so that, by antagonistic driving motions of the elastic body actuators 25-3a and 25-3b, the first arm 27 and the second arm 28 of the robot arm 101 are allowed to forwardly/reversely rotate relatively, within a plane formed in the longitudinal direction around a lateral axis of the supporting shaft of the third joint axis 21.

In the fourth joint axis 22, between the supporting member 37 of the second arm 28 and the arm-end supporting member 38 rotatably coupled to the second arm 28, elastic body actuators 25-4a and 25-4b are coupled to each other, with their phases being made different by 90 degrees from those of the elastic body actuators 25-3a and 25-3b around the longitudinal axis direction of the second arm 28, so that, by antagonistic driving motions of the elastic body actuators 25-4a and 25-4b, the electric screwdriver 29 is allowed to forwardly/reversely rotate relatively to the second arm 28, within a plane formed in the longitudinal direction around a lateral axis of the supporting shaft of the fourth joint axis 22.

Figure 10A:
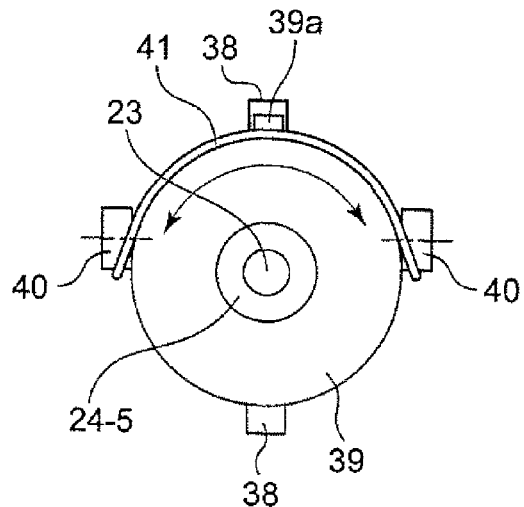
FIG. 10A is an enlarged detailed front view showing a fifth joint of the robot arm according to the first embodiment of the present invention.
Figure 10B:
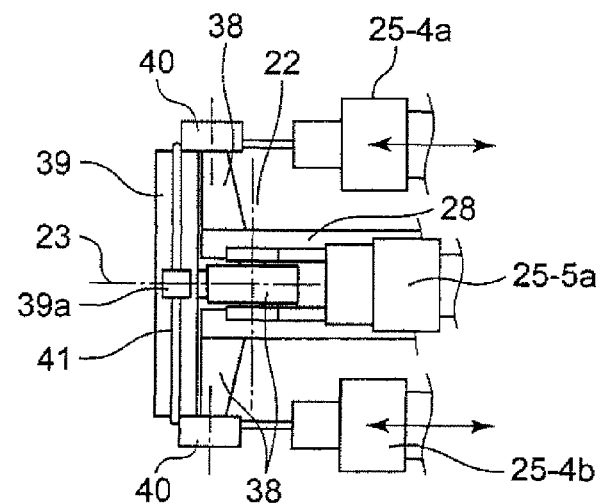
FIG. 10B is an enlarged detailed plan view showing the fifth joint of the robot arm according to the first embodiment of the present invention.
Figure 10C:
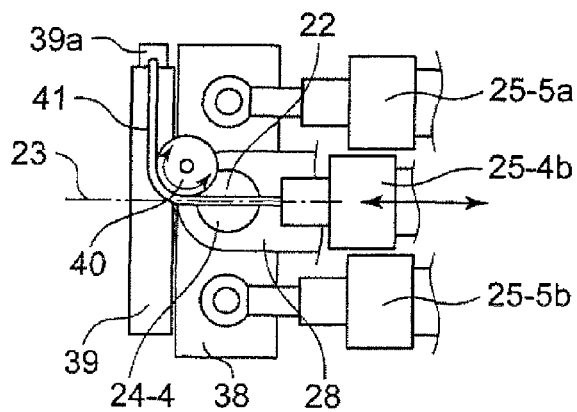
FIG. 10C is an enlarged detailed side view showing the fifth joint of the robot arm according to the first embodiment of the present invention.

As shown in FIG. 1 and the enlarged detailed views of FIGS. 10A to 10, in the fifth joint axis 23, between the supporting member 37 of the second arm 28 and an end effector base 39 rotatably coupled to the arm-end supporting member 38 around the fifth joint axis 23, elastic body actuators 25-4a and 25-4b are coupled to each other by using wires 41 that are passed over pulleys 40 that are allowed to freely rotate. That is, the respective tip ends of the elastic body actuators 25-4a, 25-4b and a fixed portion 39a fixed in a mid point between the paired pulleys 40 of the end effector base 39 are coupled to each other by using the wires 41, with the pulleys 40 being disposed on the arm-end supporting member 38 made of a cross-shaped plate member so as to freely rotate thereon, with spaces of 180 degrees being placed around the fifth joint axis 23. Thus, by antagonistic driving motions of the elastic body actuator 25-4a and 25-4b, the electric screwdriver 29 is rotated forwardly/reversely relative to the arm-end supporting member 38 around the fifth joint axis 23.

Each of the elastic body actuators function as one example of an elastic expansion/contraction structural member.

Encoders 24-1, 24-2, 24-3, 24-4, and 24-5, which are angle sensors for measuring respective rotation angles of the joints, are attached to the first joint axis 19, second joint axis 20, third joint axis 21, fourth joint axis 22, and fifth joint axis 23 (see FIG. 5), so that the joint angles (rotation angles) of the respective joints can be measured.

A pressure sensor 110 is disposed at each of input/output ports (fluid-injecting/discharging members 13 of FIG. 3) of the respective elastic body actuators 25-1a, 25-1b, 25-2a, 25-2b, 25-3a, 25-3b, 25-4a, 25-4b, 25-5a, and 25-5b (see FIG. 4), so that the internal pressure of each of the respective elastic body actuators 25-1a, 25-1b, 25-2a, 25-2b, 25-3a, 25-3b, 25-4a, 25-4b, 25-5a, and 25-5b can be measured.

Figure 25A:
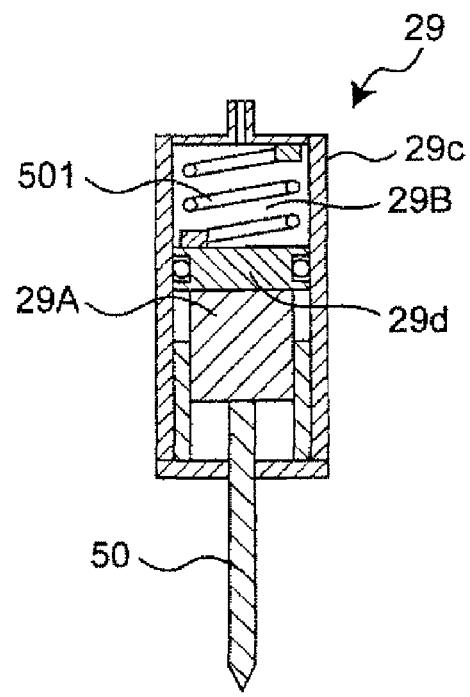
FIG. 25A is a cross-sectional view showing a structure of an electric screwdriver of the robot arm according to the first embodiment of the present invention, in which a driver bit is located at a rise position.
Figure 25B:
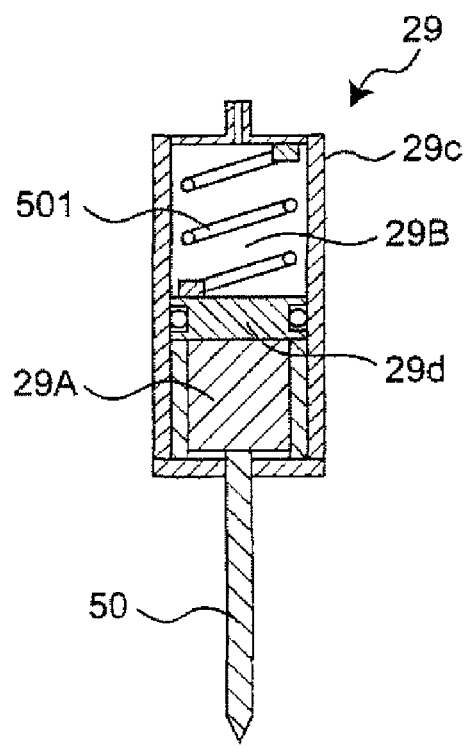
FIG. 25B is a cross-sectional view showing a structure of the electric screwdriver of FIG. 25A, in which the driver bit is located at a lower end position.

The end effector is a member that is attached to an arm-end portion (arm-end) or a hand portion so as to carry out a desired task, and a specific example is a hand or the electric screwdriver 29. In the case where the electric screwdriver 29 is used as one example of the end effector, the electric screwdriver 29 is provided with a motor 29A, a driver bit 50 that is exchangeably coupled to the rotation shaft of the motor 29A, and a pneumatic cylinder mechanism 29B that is capable of advancing or retreating the motor 29A and the driver bit 50 integrally in the axial direction, with the motor 29A and the driver bit 50 being supported thereon. As shown in FIGS. 25A and 25B, the pneumatic cylinder mechanism 29B is disposed in a cylinder 29c of the electric screwdriver 29, with a piston 29d being allowed to move inside the cylinder 29c of the electric screwdriver 29 and a pulling spring 501 is passed over the upper end of the cylinder 29c and the piston 29d. When a pressure is applied to the inside of the cylinder 29c, the piston 29d is lowered by an air pressure inside the cylinder 29c, and in contrast, when the air pressure is lowered, the piston 29d is allowed to rise inside the cylinder 29c by the action of the pulling spring 501. A motor 29A is secured to the piston 29d so that the piston 29d and the motor 29A are allowed to integrally move. Therefore, the driver bit 50 is rotated by the motor 29A of the electric screwdriver 29, while an air pressure is supplied to the pneumatic cylinder mechanism 29B that is built in the electric screwdriver 29, and supports the driver bit 50, from the air pressure supply source 15 through the air pressure adjusting unit 16 and a 5-port flow-rate control electromagnetic valve 17-6, so that as shown in FIGS. 25A and 25B, by the air pressure and the function of the pulling spring 501, expansion/contraction motions can be carried out (to allow the driver bit 50 to advance and retreat relative to the case of the electric screwdriver 29) 50 as to allow the driver bit 50 to carry out translation motions in a direction indicated by arrow x in FIG. 1. As another example of the end effector, there is proposed a hand or the like, which can carry out motions, such as transporting, inserting, and pulling motions, with a target object being grabbed thereby.

Reference numeral 42 denotes an arm-end supporting member serving as one example of the arm-end supporting mechanism, which is secured to the second arm 28 on the tip end side (on the base side from a wrist portion 88 of the robot arm 101 near the wrist portion 88) with a force sensor 51 being interposed therebetween, in a manner so as to protrude downward, and is made in contact with an external environment, for example, such as a supporting surface 90 of the robot arm supporting member, so that the arm-end supporting member 42 functions so as to stabilize the relative position and orientation relative to the supporting surface 90 of the second arm 28. The lower end of the arm-end supporting member 42 is formed into, for example, a semi-spherical shape so that the arm-end supporting member 42 is smoothly made in contact with the supporting surface 90, even with any angle. As the material for the arm-end supporting member 42, for example, a metal with a rubber member being placed on its surface, a resin, or a hard rubber, can be used so that, while friction is generated between the arm-end supporting member 42 and the supporting surface 90, it is possible to reduce shape deformations of the arm-end supporting member 42 when supported on the supporting surface 90, and also to stabilize the relative position and orientation relative to the supporting surface of the second arm 28.

In this case, the external environment refers to a supporting surface 90 of the supporting member used for supporting the arm-end supporting member 42 of the robot arm 101, such as a floor surface, a top plate of a desk, a wall surface, or a surface of another object, that is a surface of an object which is located outside the robot arm 101, and allowed to support the arm-end supporting member 42 of the robot arm 101.

Figure 11A:
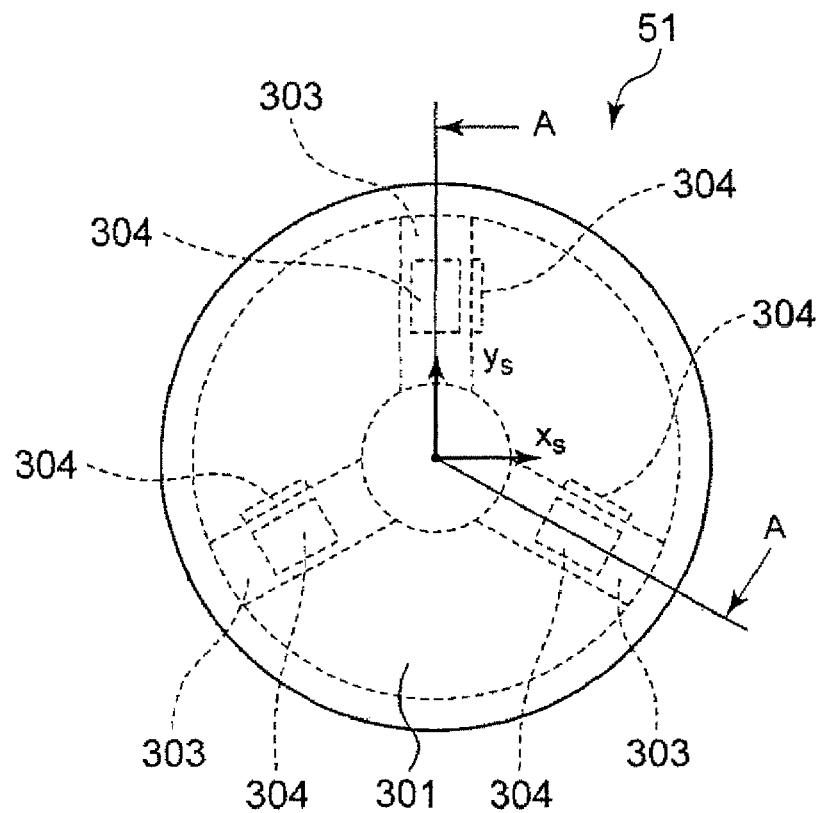
FIG. 11A is a detailed front view showing a force sensor according to the first embodiment of the present invention.
Figure 11B:
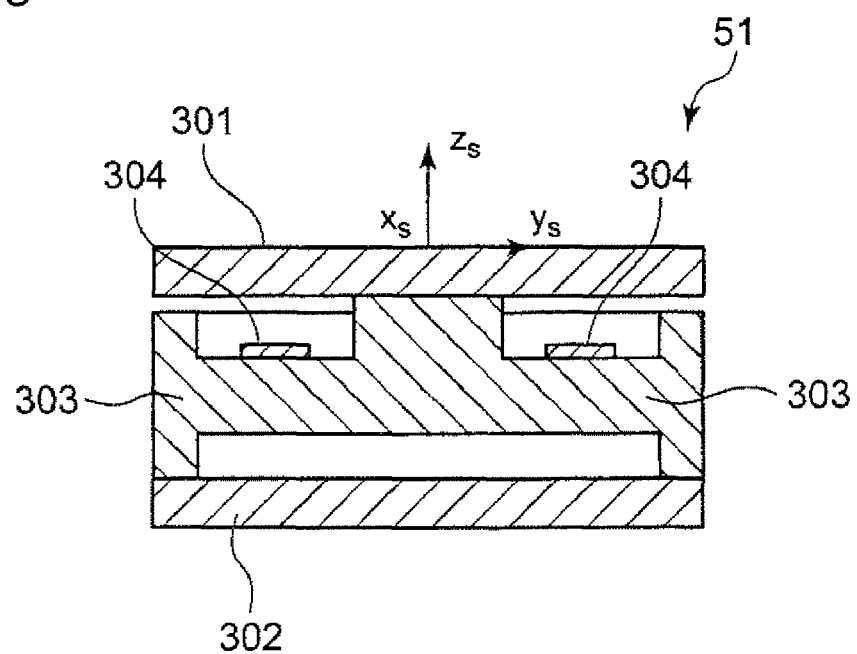
FIG. 11B is an A-A line cross-sectional view of the force sensor of FIG. 11A according to the first embodiment of the present invention.

The force sensor 51 is a six-axis force sensor, placed between the second arm 28 and the arm-end supporting member 42, which can measure a force F to be applied to the arm-end supporting member 42. As shown in FIGS. 11A and 11B in detail, the force sensor 51 is a general six-axis force sensor, and is designed to measure translation forces in three directions, xs, ys, and zs, applied between the supporting surface 302 and the measuring surface 301, and moments around the xs, ys, and zs axes, by using strain gauges 304 respectively attached onto three beams 303 disposed around the center axis with equal intervals. In the first embodiment, only the translation forces in the three directions, xs, ys, and zs, are used so that the force sensor 51 is utilized as a three-axis force sensor.

Figure 3:
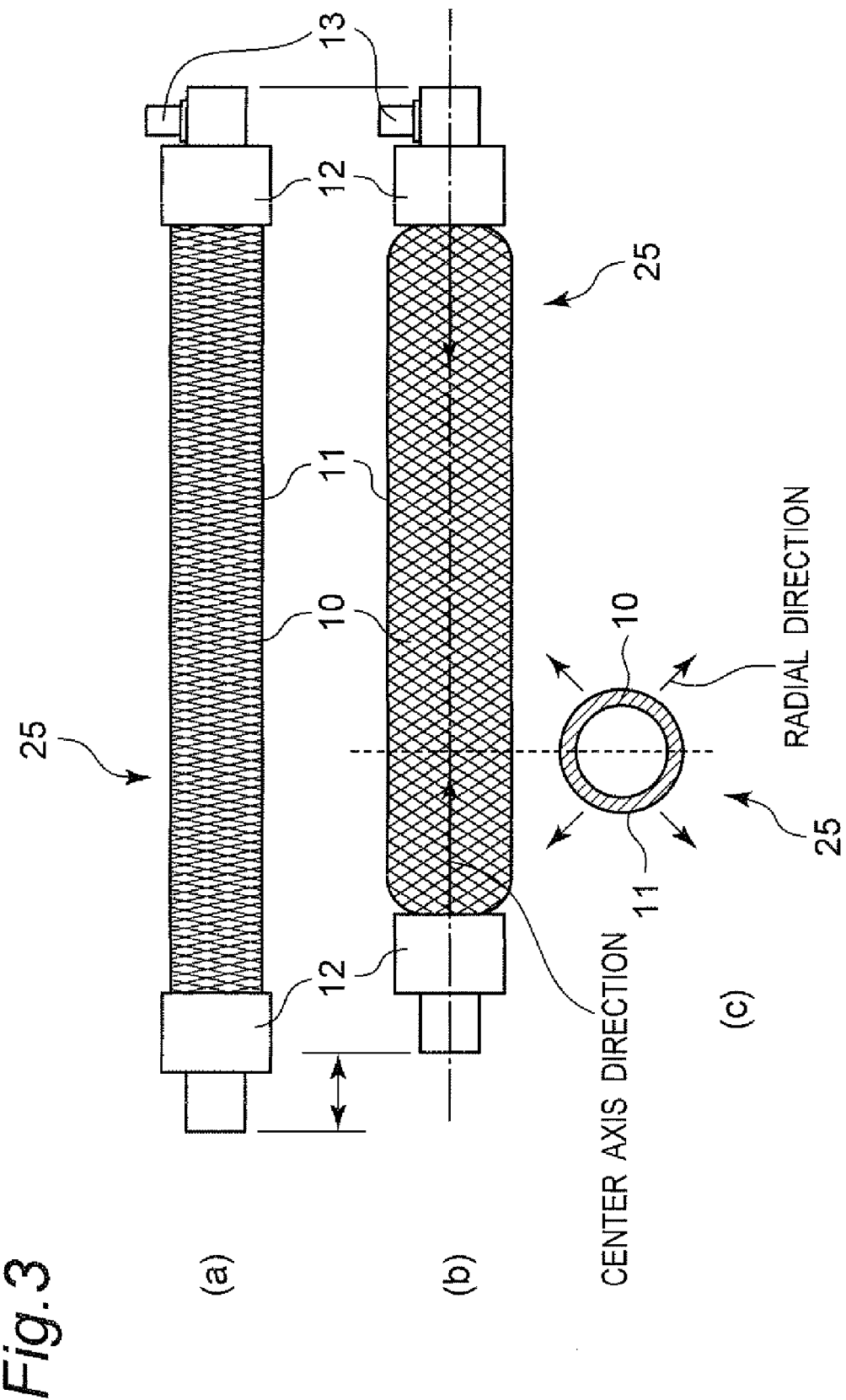
FIG. 3 is a view showing a structure of a pneumatic artificial muscle of the robot arm according to the first embodiment of the present invention.

FIGS. 3(a), 3(b), and 3(c) are views showing the structures of pneumatic artificial muscles 25, each serving as an example of each of the elastic body actuators 25-1a, 25-1b, 25-2a, 25-2b, 25-3a, 25-3b, 25-4a, 25-4b, 25-5a, and 25-5b. FIG. 3(a) is a front view showing a reduced-pressure state of the pneumatic artificial muscle 25, FIG. 3(b) is a front view showing a pressurized state of the pneumatic artificial muscle 25, and FIG. 3(c) is a cross-sectional view showing the pneumatic artificial muscle 25. As shown in FIG. 3, the pneumatic artificial muscle 25 has a structure in which a constraining member 11, made of resin or metal fiber cords that are hardly extendable materials and knitted into a network pattern, is placed on the outer surface of a tube-shaped elastic body 10 made from a rubber material, with two ends of the tube-shaped elastic body 10 being air-tightly sealed by sealing members 12. When an inner pressure is applied to the internal space of the tube-shaped elastic body 10 by supplying a compressive fluid, such as air, into the tube-shaped elastic body 10 through a fluid-injecting/discharging member 13 coupled to the sealing member 12 of one of the ends, the tube-shaped elastic body 10 tries to expand mainly in a radial direction (see FIG. 3(c)); however, because of the function of the constraining member 11, the expansion is converted into a contracting movement toward the center axis direction of the tube-shaped elastic body 10 so that the overall length is contracted (see FIG. 3(b)). In contrast, when the inner pressure of the internal space of the tube-shaped elastic body 10 is reduced by discharging the compressive fluid from the tube-shaped elastic body 10, the tube-shaped elastic body 10 tries to contract mainly in a radial direction; however, because of the function of the constraining member 11, the contraction is converted into an expanding movement toward the center axis direction of the tube-shaped elastic body 10 so that the overall length is expanded (see FIG. 3(a)). Since this pneumatic artificial muscle is mainly made of elastic bodies, it is flexible and makes it possible to provide a light-weight safe actuator.

Figure 4:
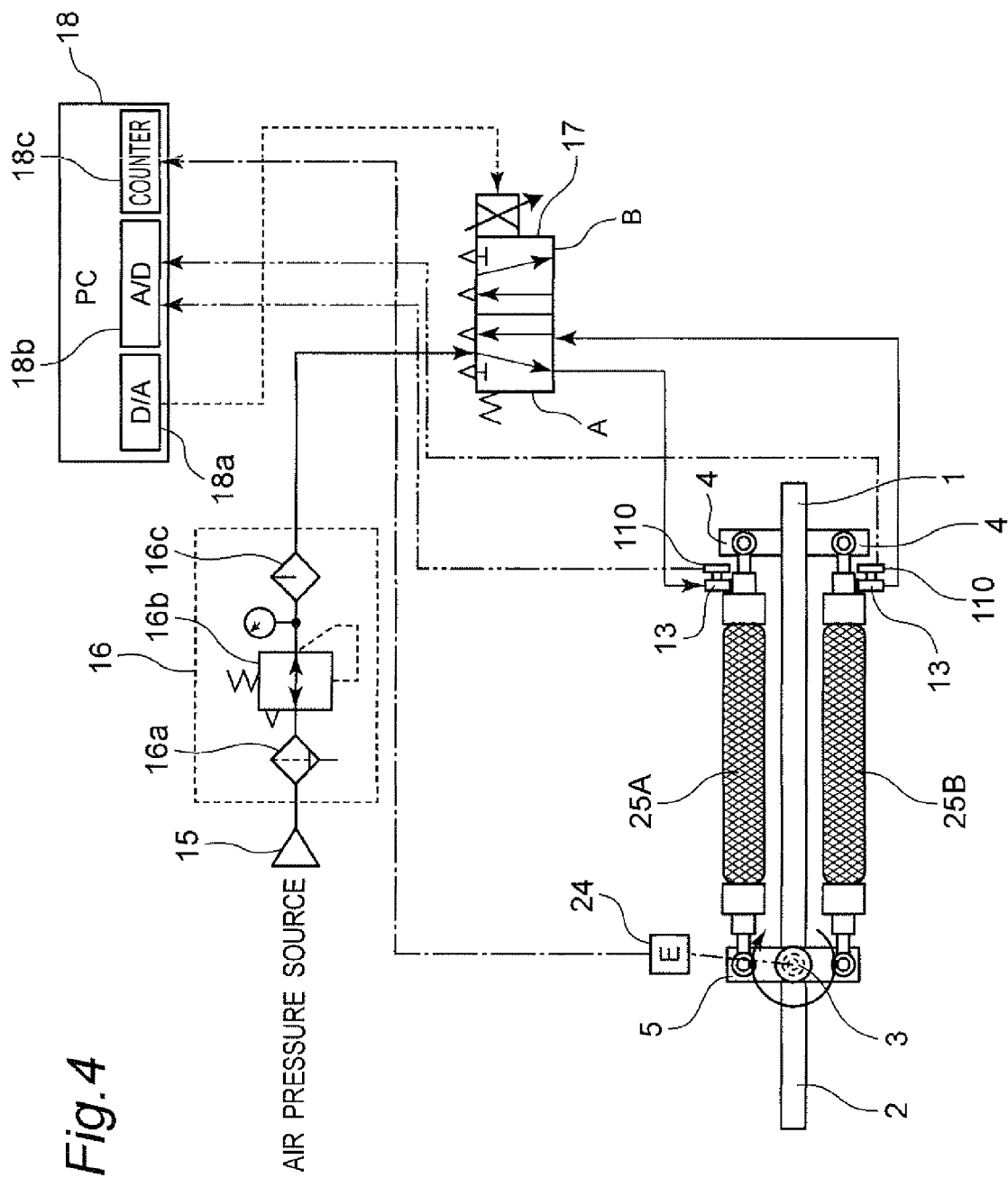
FIG. 4 is a view showing a structure of an air pressure supply driving system to drive the pneumatic artificial muscle.

FIG. 4 is a view showing a structure of an air-pressure supply driving system for use in driving the paired pneumatic artificial muscles 25, i.e., the paired pneumatic artificial muscles 25A and 25B, that are disposed around the longitudinal axis direction of a rod-shaped first structural member 1, with mutually different phases by 180 degrees so as to be antagonistically driven. In other words, this view describes structures and motions of the paired elastic actuators that are antagonistically driven. The rod-shaped first structural member 1 corresponds to each of the arms 27 and 28, or the rotation shaft 31. In FIG. 4, reference numeral 15 denotes an air pressure source, such as, for example, a compressor, and 16 denotes an air-pressure adjusting unit in which an air-pressure filter 16a, an air-pressure reducing valve 16b, and an air-pressure lubricator 16c are formed into one unit. Reference numeral 17 denotes a 5-port flow-rate control electromagnetic valve, which controls the flow rate by driving a spool valve or the like by using, for example, a force of an electromagnet. Reference numeral 18 denotes a control computer which is configured by, for example, a general-use personal computer, and a D/A board 18a is mounted thereon so that by outputting a voltage command value to the 5-port flow-rate control electromagnetic valve 17, the flow rate of air flowing through the fluid-injecting/discharging members 13 can be controlled.

Moreover, an A/D board 18b is mounted on the control computer 18 so that by inputting a voltage output value of the pressure sensor 110 thereto, the internal pressure of each of the elastic body actuators 25-1a, 25-1b, 25-2b, 25-3a, 25-3b, 25-4a, 25-4b, 25-5a, and 25-3b can be measured. Furthermore, a counter board 18c is mounted on the control computer 18 so that by inputting a signal from the encoder 24 (24-1, 24-2, 24-3, 24-4, 24-5) installed in each of the joints 3 (first joint 71, second joint 72, third joint 73, fourth joint 74, and fifth joint 75) thereto, the angle of the joint 3 (see FIG. 4) can be measured.

According to the air-pressure supply driving system shown in FIG. 4, high-pressure air generated by the air-pressure source 15 is pressure-reduced by the air-pressure adjusting unit 16 (for example, to a constant pressure such as, for example, 600 kPa, by the air-pressure adjusting unit 16), and supplied to the 5-port flow-rate control electromagnetic valve 17. The degree of opening of the 5-port flow-rate control electromagnetic valve 17 is controlled in proportion to the voltage command value outputted from the control computer 18 through the D/A board 18a. To the 5-port flow-rate control electromagnetic valve 17, the fluid-injecting/discharging members 13 of the respective tube-shaped elastic members 10 of the paired pneumatic artificial muscles 25A and 25B that carry out antagonistic driving motions, are respectively connected. The paired pneumatic artificial muscles 25A and 25B are disposed substantially in parallel with each other in the longitudinal direction of the first structural body 1, with the end portion on the flow injecting/discharging member 13 side of each of the tube-shaped elastic members 10 being secured to the actuator supporting member 4 (corresponding to the fixed wall 26, the supporting member 35, the supporting member 36, the supporting member 37, and the supporting member 37) that is secured to the end portion of the first structural body 1. An actuator driving force transmitting member 5 (corresponding to the supporting shaft 33, the round supporting member 32, the supporting member 37, the arm-end supporting member 38, and the end effector base 39), supported by the first structural body 1 through the rotation joint 3 so as to freely rotate thereon, is supported on the other end portion side of the tube-shaped elastic member 10 of each of the paired pneumatic artificial muscles 25A and 25B, and the other end portion of the tube-shaped elastic member 10 of each of the paired pneumatic artificial muscles 25A and 25B is supported on the actuator driving force transmitting member 5 so as to freely rotate thereon. Therefore, as will be described below, when the tube-shaped elastic member 10 of each of the paired pneumatic artificial muscles 25A and 25B is expanded/contracted, the actuator driving force transmitting member 5 is driven to forwardly/reversely rotate around the rotation joint 3 so that the second structural body 2 is driven to forwardly/reversely rotate around the rotation joint 3. In this case, a rightward rotation, indicated by an arrow in FIG. 4, is defined as a forward direction, and a leftward rotation, opposite to the arrow direction, is defined as a reverse direction.

In the case where a positive voltage command value, outputted from the control computer 18, is inputted from the D/A board 18a to the 5-port flow-rate control electromagnetic valve 17, the sequence is brought into a state indicated by A of air-pressure circuit symbols, as shown in FIG. 4, and a passage is opened from the air-pressure source 15 side toward the fluid-injecting/discharging member 13 side of the tube-shaped elastic member 10 of the pneumatic artificial muscle 25A through the 5-port flow-rate control electromagnetic valve 17, with the result that air having a flow rate that is proportional to the absolute value of the voltage command value is supplied toward the pneumatic artificial muscle 25A side. Moreover, on the pneumatic artificial muscle 25B side, a passage is opened from the fluid-injecting/discharging member 13 side of the tube-shaped elastic member 10 toward the atmospheric pressure side through the 5-port flow-rate control electromagnetic valve 17, with the result that air having a flow rate that is proportional to the absolute value of the voltage command value is discharged from the pneumatic artificial muscle 25B side into the atmospheric air. Therefore, as shown in FIG. 4, the overall length of the pneumatic artificial muscle 25A is contracted, while the overall length of the pneumatic artificial muscle 25B is extended so that the rotation joint 3 carries out a rightward rotary motion indicated by an arrow around the axis of the rotation joint 3 at a speed in proportion to the absolute value of the voltage command value.

In contrast, in the case where a negative voltage command value, outputted from the control computer 18, is inputted from the D/A board 18a to the 5-port flow-rate control electromagnetic valve 17, the 5-port flow-rate control electromagnetic valve 17 is switched from the state indicated by A of the air-pressure circuit symbols to a state indicated by B, so as to be in the state indicated by B of the air-pressure circuit symbols, whereby in a manner opposite to the motions of the pneumatic artificial muscle 25A, the rotation joint 3 carries out a leftward rotary motion around the axis of the rotation joint 3. That is, a passage is opened from the air-pressure source 15 side toward the fluid-injecting/discharging member 13 side of the tube-shaped elastic member 10 of the pneumatic artificial muscle 25B through the 5-port flow-rate control electromagnetic valve 17, with the result that air having a flow rate that is proportional to the absolute value of the voltage command value is supplied toward the pneumatic artificial muscle 25B side. Moreover, on the pneumatic artificial muscle 25A side, a passage is opened from the fluid-injecting/discharging member 13 side of the tube-shaped elastic member 10 toward the atmospheric pressure side through the 5-port flow-rate control electromagnetic valve 17, with the result that air having a flow rate that is proportional to the absolute value of the voltage command value is discharged from the pneumatic artificial muscle 25A side into the atmospheric air. Therefore, the overall length of the pneumatic artificial muscle 25B is contracted, while the overall length of the pneumatic artificial muscle 25A is extended so that the rotation joint 3 of the joint axis carries out a leftward rotary motion indicated by a direction opposite to the arrow of FIG. 4 around the axis of the rotation joint 3 at a speed in proportion to the absolute value of the voltage command value.

As described above, rotary motions are forwardly/reversely driven around the axis of the rotation joint 3 by the pneumatic artificial muscles 25A and 25B so that relative rocking motions between the first structural body 1 and the second structural body 2, that is, rotary motions with predetermined angles, are driven around the axis of the rotation joint 3.

Figure 5:
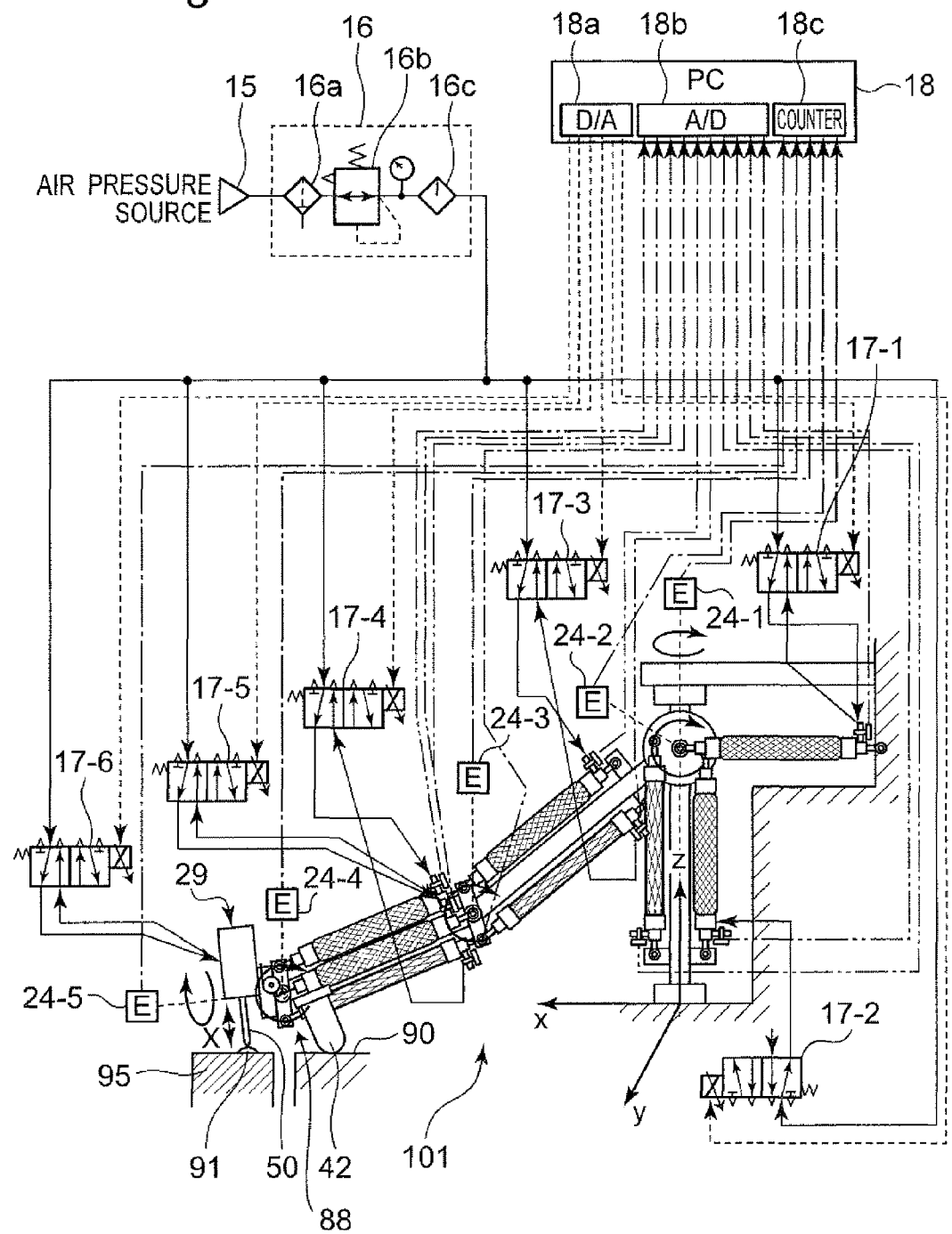
FIG. 5 is a view showing a structure of an air pressure supply driving system to drive the robot arm to which a joint driving mechanism is applied according to the first embodiment of the present invention.

FIG. 5 is a view showing a structure of an air-pressure supply system for use in driving the robot arm 101 shown in FIG. 1. In the air-pressure supply system shown in FIG. 5, six 5-port flow-rate control electromagnetic valves 17-1, 17-2, 17-3, 17-4, 17-5, and 17-6 are disposed so that an air pressure can be applied from the air pressure source 15 through the air-pressure adjusting unit 16. Each of the six 5-port flow-rate control electromagnetic valves 17-1, 17-2, 17-3, 17-4, 17-5, and 17-6, is formed by the 5-port flow-rate control electromagnetic valve 17 described above. Since the other structures and motional principle are the same as those shown in FIG. 4, the detailed description thereof will not be given.

An air pressure is applied to the elastic body actuators 25-1*a* and 25-1*b* from the 5-port flow-rate control electromagnetic valve 17-1 so that a forwardly/reversely rotary motion is driven around the first joint axis 19; an air pressure is applied to the elastic body actuators 25-2*a* and 25-2*b* from the 5-port flow-rate control electromagnetic valve 17-2 so that a forwardly/reversely rotary motion is driven around the second joint axis 20; an air pressure is applied to the elastic body actuators 25-3*a* and 25-3*b* from the 5-port flow-rate control electromagnetic valve 17-3 so that a forwardly/reversely rotary motion is driven around the third joint axis 21; an air pressure is applied to the elastic body actuators 25-4*a* and 25-4*b* from the 5-port flow-rate control electromagnetic valve 17-4 so that a forwardly/reversely rotary motion is driven around the fourth joint axis 22; and an air pressure is applied to the elastic body actuators 25-5*a* and 25-5*b* from the 5-port flow-rate control electromagnetic valve 17-5 so that a forwardly/reversely rotary motion is driven around the fifth joint axis 23.

Note that, by applying an air pressure to the pneumatic cylinder mechanism 29B that is installed in the electric screwdriver 29 and supports the driver bit 50 from the 5-port flow-rate control electromagnetic valve 17-6, the driver bit 50 can be driven to expand/contract so that the driver bit 50 is allowed to carry out a translation motion in a direction indicated by the arrow X in FIG. 1.

With the above-mentioned structures having multiple degrees of freedom, it becomes possible to allow the tilt in the axial direction of the driver bit 50 supported by the arm-ends of the robot arm 101 to be adjusted to a direction along the axial direction of a screw, which will be described later, and consequently to securely engage the lower end of the driver bit 50 with a screw head 91 of a screw of an assembling structural object 95.

Figure 2:
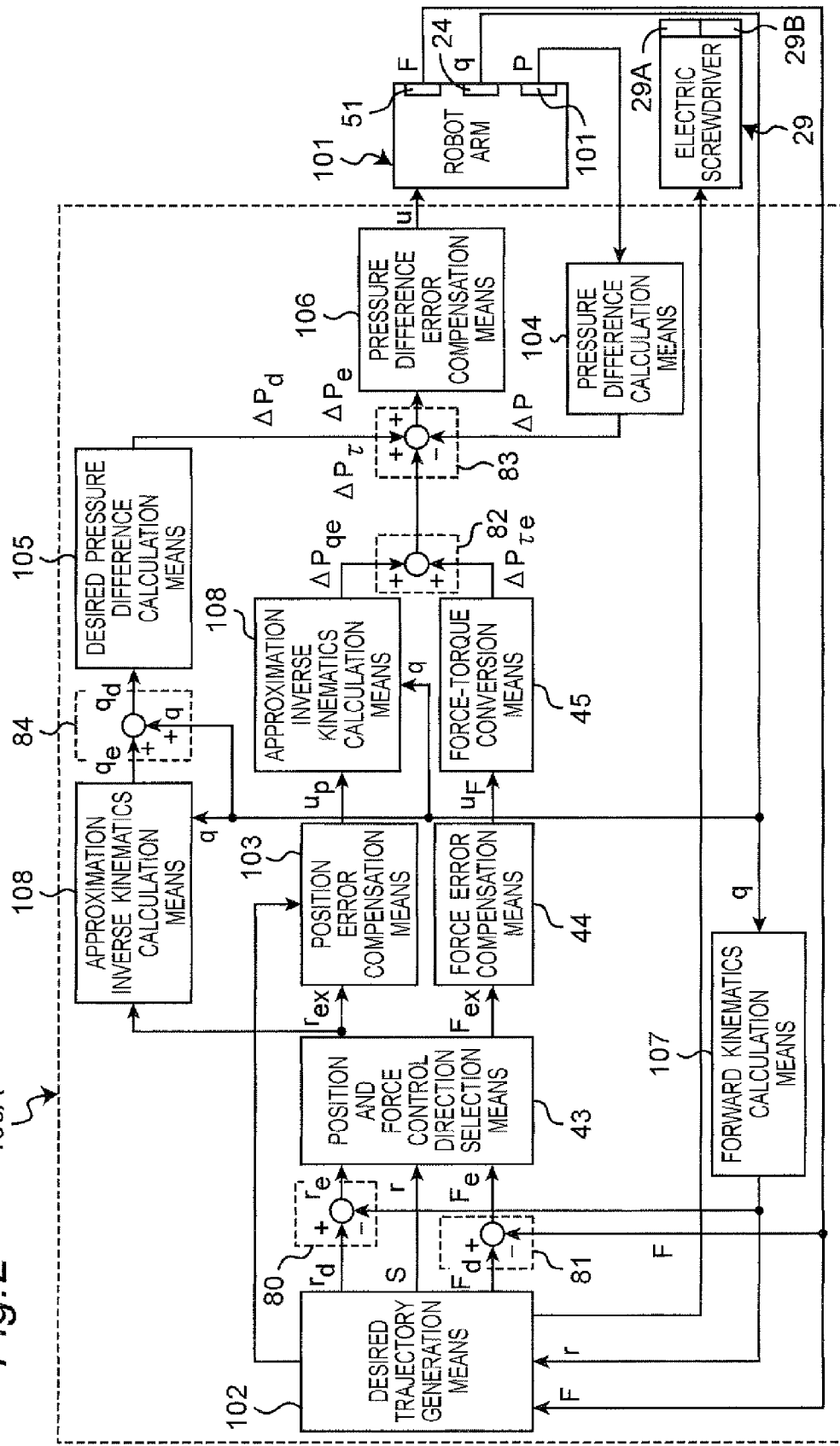
FIG. 2 is a block diagram showing a structure of a robot that includes a control device of the robot arm according to the first embodiment of the present invention.

FIG. 2 is a block diagram showing a structure of the control unit 109 that is one example of a contact motion control unit of the robot arm 101 according to the first embodiment of the present invention. In FIG. 2, reference numeral 101 denotes the robot arm according to the first embodiment shown in FIG. 1. From the robot arm 101, current values of joint angles measured by the respective encoders 24 (24-1, 24-2, 24-3, 24-4, and 24-5) (see FIG. 5), indicated by the following expression:

$$q=[q_1, q_2, q_3, q_4, q_5]^T \qquad \text{[Expression 1]}$$

and internal pressures of the elastic body actuators 25-1*a*, 25-1*b*, 25-2*a*, 25-2*b*, 25-3*a*, 25-3*b*, 25-4*a*, 25-4*b*, 25-5*a*, and 25-5*b*, measured by the respective pressure sensors 110, indicated by the following expression:

$$P=[P_{1a}, P_{1b}, P_{2a}, P_{2b}, P_{3a}, P_{3b}, P_{4a}, P_{4b}, P_{5a}, P_{5b}]^T \qquad \text{[Expression 2]}$$

as well as a force that is exerted between the arm-end supporting member 42 and the supporting surface 90, measured by the force sensor 51 and represented by the following expression, are outputted.

$$F=[F_x, F_y, F_z]^T \qquad \text{[Expression 3]}$$

In this case, each of $q_1$, $q_2$, $q_3$, $q_4$, and $q_5$ is a joint angle of each of the first joint 71, second joint 72, third joint 73, fourth joint 74, and fifth joint 75. Moreover, each of $P_{1a}$, $P_{1b}$, $P_{2a}$, $P_{2b}$, $P_{3a}$, $P_{3b}$, $P_{4a}$, $P_{4b}$, $P_{5a}$, and $P_{5b}$ is an internal pressure of each of the elastic body actuators 25-1*a*, 25-1*b*, 25-2*a*, 25-2*b*, 25-3*a*, 25-3*b*, 25-4*a*, 25-4*b*, 25-5*a*, and 25-5*b*. Furthermore, $F_x$, $F_y$, and $F_z$ respectively correspond to a force in an x-direction of the coordinate axis, a force in a y-direction of the coordinate axis and a force in a z-direction of the coordinate axis of the robot arm 101 relative to the fixed wall 26.

Reference numeral 104 denotes a pressure difference calculation means, and a pressure difference LP is calculated based upon the measured value P (internal pressure value of the elastic body actuator) of the pressure sensor 110:

$$\Delta P=[\Delta P_1, \Delta P_2, \Delta P_3, \Delta P_4, \Delta P_5]^T=[P_{1a}-P_{1b}, P_{2a}-P_{2b}, P_{3a}-P_{3b}, P_{4a}-P_{4b}, P_{5a}-P_{5b}]^T \qquad \text{[Expression 4]}$$

and the resulting value is outputted from the pressure difference calculation means 104 to a fourth motion unit 83.

Reference numeral 107 denotes a forward kinematics calculation means, and the forward kinematics calculation means 107 carries out geometrical calculations for converting the current values q (current values of the joint angles measured by the respective encoders 24 (24-1, 24-2, 24-3, 24-4, and 24-5)) of the joint angle vectors of the robot arm 101 into arm-end position and orientation vectors r. The position and orientation vectors converted by the forward kinematics calculation means 107, are inputted to a desired trajectory calculation means 102, which will be described later, from the forward kinematics calculation means 107.

Reference numeral 102 denotes a desired trajectory generation means, and arm-end position and orientation desired vectors $r_d$ for use in achieving a desired motion of the robot arm 101 and a force (desired force vector) $F_d$ for use as a target upon pressing the arm-end supporting member 42 onto the supporting surface 90 are outputted from the desired trajectory generation means 102 to a position and force control direction selection means 43. Moreover, a position and force control direction command S, obtained by the following expression, is outputted from the desired trajectory generation means 102 to the position and force control direction selection means 43.

$$S=[S_x, S_y, S_z]^T \qquad \text{[Expression 5]}$$

A position and force control direction command S represents a command value used for instructing whether the respective position controlling motions in the x-direction, y-direction and z-direction of the coordinate axes are carried out or the force controlling motions are carried out, and upon carrying out the position control, the command is set to 1, while upon carrying out the force controlling motion, the command is set to 0. For example, in the case where a position controlling motion is carried out in the x-direction, a position controlling motion is carried out in the y-direction, and a force controlling motion is carried out in the z-direction, a value is calculated from the following expression:

$$S=[1, 1, 0]^T \qquad \text{[Expression 6]}$$

Thus, the resulting value is outputted from the desired trajectory generation means 102 to the position and force control direction selection means 43.

Reference numeral 43 denotes the position and force control direction selection means. A first motion unit 80 calculates an error between the desired position and orientation desired vector $r_d$ outputted from the desired trajectory generation means 102 and the position and orientation vector r given from the forward kinematics calculation means 107 so as to obtain a position error $r_e$. The position error $r_e$, obtained by the first motion unit 80, is inputted to the position and force control direction selection means 43. In the position and force control direction selection means 43, based upon the position error $r_e$ obtained by the first motion unit 80 and the position and force control direction command S, outputted from the desired trajectory generation means 102, only a corrected error of the arm-end position and orientation, for example, a corrected error $r_{ex}$ in a direction in which the position control is carried out is calculated and extracted to output the resulting value to position error compensation means 103. The extraction of the corrected error $r_{ex}$ in the direction in which the position control is carried out is executed based upon the following equation (1):

[Expression 7]

$$r_{ex} = \begin{pmatrix} S_x & 0 & 0 & 0 & 0 & 0 \\ 0 & S_y & 0 & 0 & 0 & 0 \\ 0 & 0 & S_z & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} r_e \qquad (1)$$

Moreover, in the position and force control direction selection means 43, an error between a force F exerted between the arm-end supporting member 42 and the supporting surface 90 and a desired force vector $F_d$ corresponding to a desired force to be used at the time when the arm-end supporting member 42 is pressed onto the supporting surface 90, outputted from the desired trajectory generation means 102, is calculated by a second motion unit 81 so as to obtain a force error $F_e$. The force error $F_e$, obtained by the second motion unit 81, is inputted to the position and force control direction selection means 43.

In the position and force control direction selection means 43, based upon the force error $F_e$ obtained by the second motion unit 81 and the position and force control direction command S outputted from the desired trajectory generation means 102, only the force corrected error $F_{ex}$ in a direction corresponding to the force control is calculated and extracted so as to be outputted to a force error compensation means 44. The extraction of the force corrected error $F_{ex}$ in a direction corresponding to the force control is executed based upon the following equation (2)

[Expression 8]

$$F_{ex} = \begin{pmatrix} 1-S_x & 0 & 0 & 0 & 0 & 0 \\ 0 & 1-S_y & 0 & 0 & 0 & 0 \\ 0 & 0 & 1-S_z & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix} F_e \qquad (2)$$

In the force error compensation means 44, a force error correcting output $u_F$ is calculated and obtained from the force corrected error $F_{ex}$ in a direction corresponding to the force motion. The force error correcting output $u_F$ is outputted toward a force-torque conversion means 45 from the force error compensation means 44.

Reference numeral 103 denotes a position error compensation means, and to the position error compensation means 103, a corrected error r, corresponding to the direction for the position control is inputted from the position and force control direction selection means 43. In the position error compensation means 103, based upon the corrected error r, corresponding to the direction for the position control, a position error correcting output $u_p$ is calculated and obtained. Note that, in the position error compensation means 103, arrows from the desired trajectory calculation means 102 indicate commands from the desired trajectory calculation means 102 to be used upon altering gains of the position error compensation means in the following steps D, G, H, J, and the like. From the position error compensation means 103, the position error correcting output $u_p$ obtained by the calculations is inputted to an approximation inverse kinematics calculation means 108A.

Reference numeral 108A denotes the approximation inverse kinematics calculation means, and approximation calculations on inverse kinematics are executed in the approximation inverse kinematics calculation means 108A based upon the following approximate expression.

$$u_{out} = J_r(q)^{-1} u_{in} \qquad [\text{Expression 9}]$$

In this case, $J_r(q)$ represents a Jacob matrix. Moreover, $u_{in}$ represents an input (in this case, the position error correcting output $u_p$) given from the position error compensation means 103 to the approximation inverse kinematics calculation means 108A. Furthermore, $u_{out}$ represents an output (in this case, the position error correcting output $\Delta P_{qe}$) from the approximation inverse kinematics calculation means 108A. Further, supposing that $u_{in}$ is equal to the position error correcting output $u_p$, the following transform expression from the position error correcting output $u_p$ to the position error correcting output $\Delta P_{qe}$ is obtained.

$$\Delta P_{qe} = J_r(q)^{-1} u_p \qquad [\text{Expression 10}]$$

According to the approximation inverse kinematics calculation means 108A, even in the case of a structure in which inverse kinematics calculations are difficult to be executed, such as a robot arm with multiple degrees of freedom of 5 degrees or more of freedom, the inverse kinematics calculations can be easily carried out.

A desired internal state determination means includes a desired pressure difference calculation means 105 and an approximation inverse kinematics calculation means 108B.

Based upon the following approximate expression, the approximation inverse kinematics calculation means 108B executes approximation calculations on inverse kinematics.

$$u_{out} = J_r(q)^{-1} u_{in} \qquad [\text{Expression 11}]$$

In this case, $J_r(q)$ is a Jacob matrix. Moreover, $u_{in}$ represents an input from the position and force control direction selection means 43 to the approximation inverse represents an output from the approximation inverse kinematics calculation means 108B to a fifth motion unit 84. Further, supposing that $u_{in}$ is equal to the arm-end position and orientation corrected error $r_{ex}$, the following transform expression from the arm-end position and orientation corrected error $r_{ex}$ to the joint angle error $q_e$ is obtained.

$$q_e = J_r(q)^{-1} r_{ex} \qquad [\text{Expression 12}]$$

According to the approximation inverse kinematics calculation means 108B, even in the case of a structure in which inverse kinematics calculations are difficult to be executed, such as a robot arm with multiple degrees of freedom of 5 degrees or more of freedom, the inverse kinematics calculations can be easily carried out.

The fifth motion unit 84 adds an output joint-angle error $q_e$ from the approximation inverse kinematics calculation means 108B and a current value q (a current value of a joint angle measured by each of the encoders (24-1, 24-2, 24-3, 24-4, and 24-5)) of the joint angle vector so as to obtain a desired value $q_d$ of the joint angle. The desired value $q_d$ of the joint angle obtained by the fifth motion unit 84 is inputted to the desired pressure difference calculation means 105.

To the desired pressure difference calculation means 105, the following value is inputted from the fifth motion unit 84 as a desired joint angle.

$$q_d = q + J_r(q)^{-1} r_{ex} \quad \text{[Expression 13]}$$

Thus, based upon the joint desired vector $q_d$, the desired pressure difference is calculated by the following expression, and the resulting value is outputted from the desired pressure difference calculation means 105 to a fourth motion unit 83.

$$\Delta P_d = [\Delta P_{1d}, \Delta P_{2d}, \Delta P_{3d}, \Delta P_{4d}, \Delta P_{5d}]^T \quad \text{[Expression 14]}$$

In this case, $\Delta P_{1d}$, $\Delta P_{2d}$, $\Delta P_{3d}$, $\Delta P_{4d}$, and $\Delta P_{5d}$ respectively correspond to a desired value of a pressure difference between the elastic body actuators 25-1a and 25-1b, a desired value of a pressure difference between the elastic body actuators 25-2a and 25-2b, a desired value of a pressure difference between the elastic body actuators 25-3a and 25-3b, a desired value of a pressure difference between the elastic body actuators 25-4a and 25-4b, and a desired value of a pressure difference between the elastic body actuators 25-5a and 25-5b.

In the force-torque conversion means 45, a force error correcting output $\Delta P_{\tau e}$ for use in correcting a force error $F_e$ is calculated from the following equation (3), and the resulting value is outputted.

[Expression 15]

$$\Delta P_{\tau e} = J_r^T u_F \quad (3)$$

The position error correcting output $\Delta P_{qe}$ outputted from the approximation inverse kinematics calculation means 108A and the force error correcting output $\Delta P_{\tau e}$ outputted from the force-torque conversion means 45 are added to each other by a third motion unit 82 so that a position and force error correcting output $\Delta P_\tau$ ($\Delta P_\tau = \Delta P_{qe} + \Delta P_{\tau e}$) is obtained.

The desired pressure difference $\Delta P_d$ outputted from the desired pressure difference calculation means 105 and the position and force error correcting output $\Delta P_\tau$ found in the third motion unit 82 are added to each other in the fourth motion unit 83, and from the added value, the current pressure difference $\Delta P$ outputted from the pressure difference calculation means 104 is subtracted in the fourth motion unit 83.

Reference numeral 106 denotes a pressure difference error compensation means. The value obtained by the fourth motion unit 83 is inputted to the pressure difference error compensation means 106. In the pressure difference error compensation means 106, a pressure difference corrected output u is calculated based upon the value inputted from the fourth motion unit 83, and the pressure difference corrected output u is outputted to the robot arm 101. The pressure difference corrected output u is given to the respective 5-port flow-rate control electromagnetic valves 17-1, 17-2, 17-3, 17-4, 17-5, and 17-6 through a D/A board lea of the control computer 18 of the robot arm 101 as a voltage command value, and each of the joint axes 19, 20, 21, 22, and 23 is driven to generate a rotary motion of each of the joints so that the robot arm 101 is operated.

In the following, a description will be given of the principle of control motions of the control unit 109 having the above-mentioned structure. The control motions are based upon a hybrid control motion between position and force in which a feed-back control (position control) of the position error $r_e$ of the arm-end position (the position of the end effector) by the position error compensation means 103 and a feed-back control (force control) of the force F that is generated in the arm-end by the force error compensation means 44 are simultaneously achieved differently depending on directions designated by the position and force control direction commands 5, and for example, a PID compensator is used as the position error compensation means 103 and for example, a PI compensator is used as the force error compensation means 44; thus, the control is exerted so as to converge the position error $r_e$ of the arm-end position to 0, while the control is also exerted so as to converge the force error $F_e$ generated in the arm-end to 0 so that a desired motion of the robot arm 101 is realized.

However, in the case where an elastic body actuator, for example, an actuator operated by a fluid such as air, as shown in FIGS. 3(a) to 3(c), is used for the driving motion, its response characteristic is poor due to elastic factors of the elastic body actuator, that is, influences from compressibility of fluid, or passage resistance, or the like, whereby a controlling motion with high precision is not obtained.

As means for addressing these issues, the feed-back control of the pressure difference $\Delta P$ by the pressure difference error compensation means 106 is proposed. Since the position error correcting output $\Delta P_{qe}$ is inputted to the pressure difference error compensation means 106 so that, upon generation of the arm-end position and orientation error $r_e$, the pressure difference error compensation means 106 is operated so that the pressure difference is controlled so as to converge the arm-end position and orientation error $r_e$ to 0. In the elastic body actuator 25 shown in FIGS. 3(a) to 3(c), since a displacement is first generated after a change in the internal pressure has occurred, the pressure change is observed earlier than the positional change (displacement) from the viewpoint of time. Therefore, as indicated by a control system shown in FIG. 2, by forming an internal pressure feed-back loop for controlling the pressure difference inside the position feed-back loop that carries out the position control, the poor response characteristic can be compensated for and the position controlling performance can be improved.

However, in the case where only the pressure difference error compensation means 106 is installed, although the response characteristic can be improved, a constant positional deviation occurs, resulting in an issue in that the positioning precision cannot be improved. This is because of the fact that a pressure difference required for achieving the desired value $q_d$ of the joint angle is not inputted to the pressure difference error compensation means 106 as a desired value.

Figure 6:
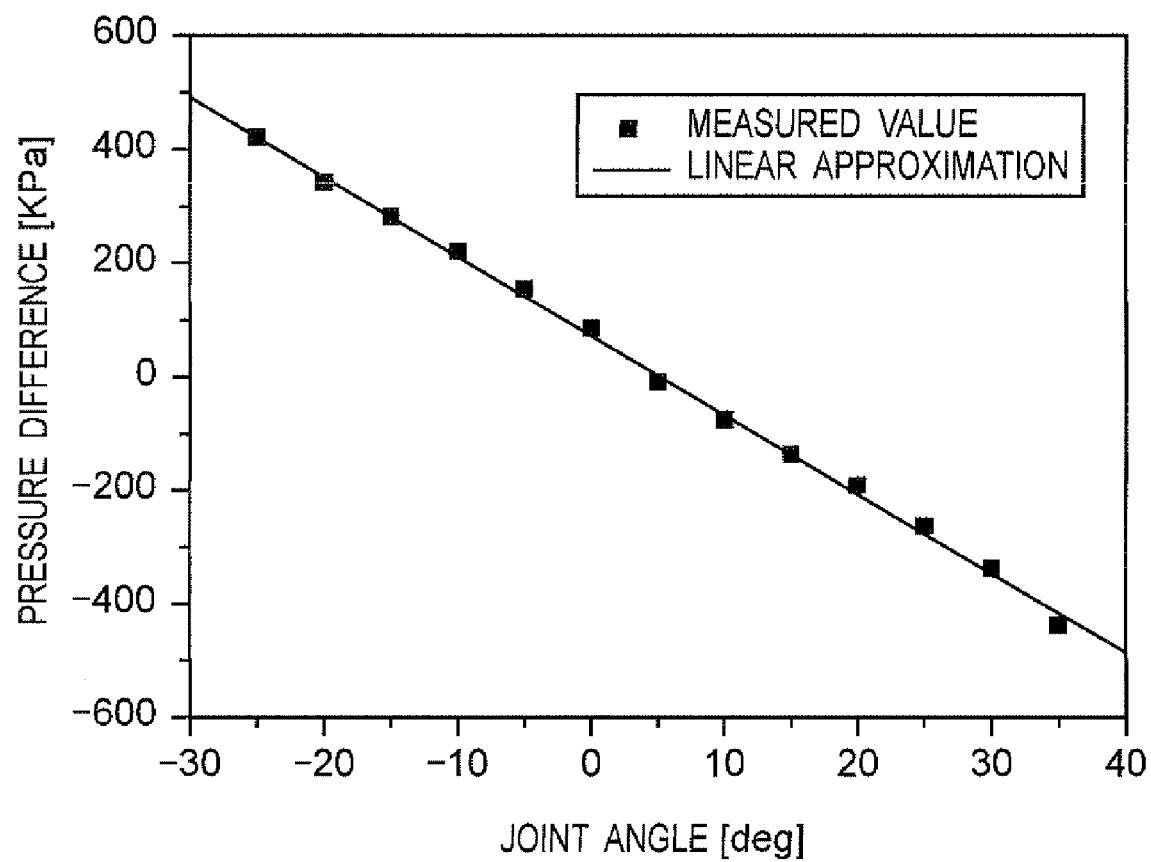
FIG. 6 is a graph showing a relationship between a joint angle and an internal pressure difference in a antagonistic driving motion by an elastic body actuator of the robot arm according to the first embodiment of the present invention.

As means for addressing these issues, the desired pressure difference calculation means 105 is installed. As shown in FIG. 4, in the case where antagonistic driving motions are carried out on the rotation joint 3 by using a pair of elastic actuators 25a and 25B, the relationship between the joint angle 3 and the internal pressure difference is, for example, shown in FIG. 6. FIG. 6 shows the result of a case where elastic body actuators (Mckibben-type pneumatic artificial muscles) having an overall length of 250 mm and an inner diameter of 10 mm are used. As shown in FIG. 6, the results of measurements can be substantially approximated by a straight line. Therefore, as an equation for use in calculating a desired pressure difference $\Delta P_d$, the following linear expression representing a straight line can be used.

[Expression 16]

$$\Delta P_d = A q_d + b \quad (4)$$

In this case, A and b are coefficients that can be obtained from the results of measurements of FIG. 6. Therefore, in the desired pressure difference calculation means 105, by calculating a desired pressure difference $\Delta Pd$ from the desired value $q_d$ of the joint angle by the equation (4) and then inputting the resulting value to the pressure difference error compensation means 106 through the fourth motion unit 83, a high-precision position controlling motion with a small constant deviation can be realized.

Figure 7:
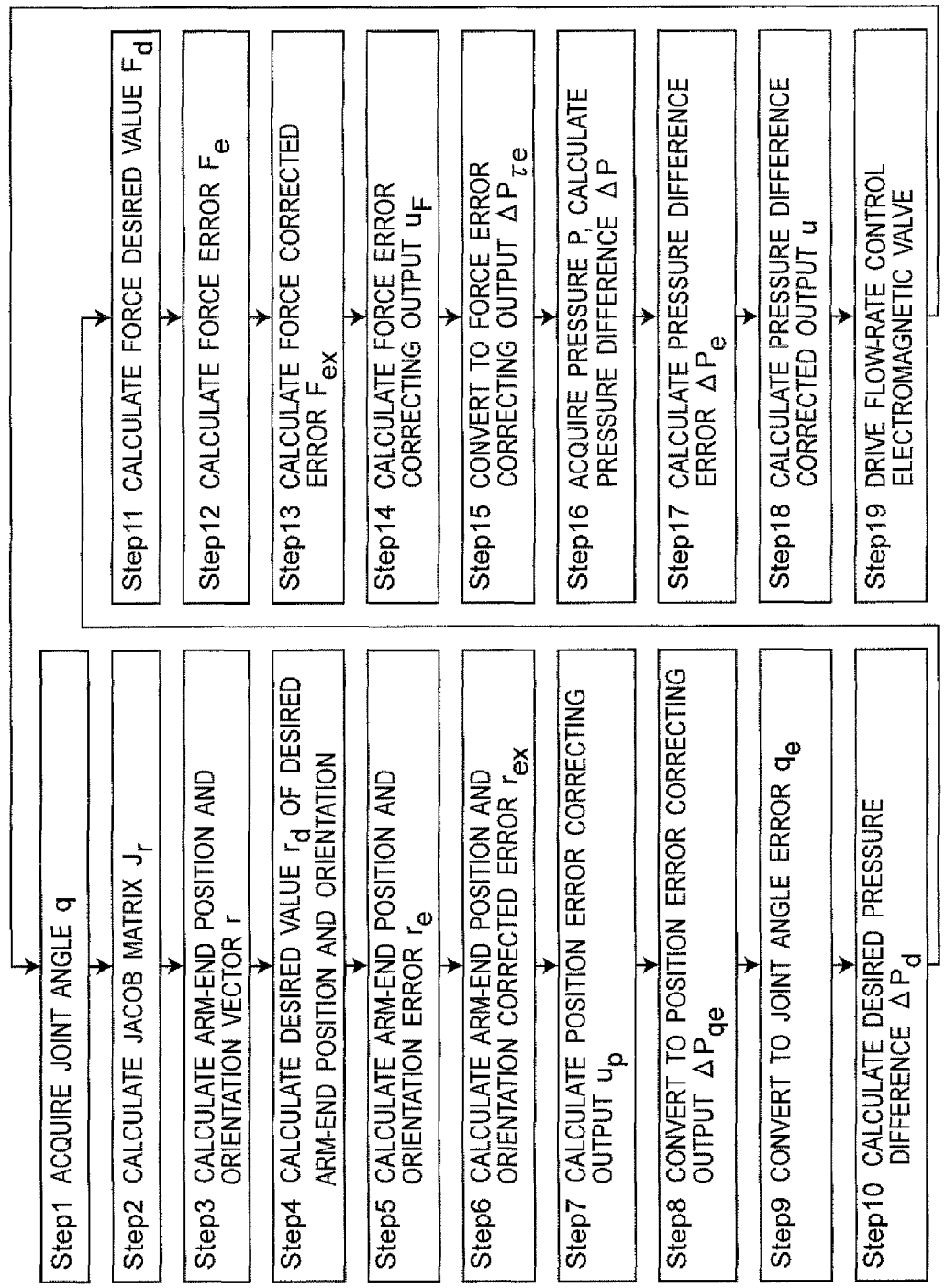
FIG. 7 is a flow chart showing actual motion steps of a control program of the robot arm according to the first embodiment of the present invention.

Referring to a flow chart of FIG. 7, a description will be given of actual calculation steps of a control program to be executed by a computer so as to carry out controlling motions based upon the above-mentioned principle.

In step 1, joint angle data (joint variable vector q) which was measured by each of the encoders 24 (24-1, 24-2, 24-3, 24-4, and 24-5) is captured by the control unit 109.

Next, in step 2, calculations of a Jacob matrix J, or the like, required for kinematics calculations of the robot arm 101, are carried out by the approximation inverse kinematics calculation means 108A and the approximation inverse kinematics calculation means 108B respectively.

Next, in step 3, the current arm-end position and orientation vector r of the robot arm 101 is calculated from the joint angle data (joint variable vector q) (processes in the forward kinematics calculation means 107).

Next, in step 4, a desired value $r_d$ (arm-end position and orientation desired vector) of the arm-end position and orientation of the robot arm 101 is calculated by the desired trajectory generation means 102.

Next, in step 5, an error $r_e$ of the arm-end position and orientation corresponding to a difference between a desired value $r_d$ of the arm-end position and orientation (desired vector of arm-end position and orientation) and the current arm-end position and the orientation vector r is calculated by the first motion unit 80.

Next, in step 6, only a component relating to a direction to be subjected to position control is extracted from the error $r_e$ of the arm-end position and orientation in the position and force control direction selection means 43, and a corrected error $r_{ex}$ of the arm-end position and orientation, with the component relating to a direction to be subjected to the force control being set to 0, is outputted from the position and force control direction selection means 43.

Next, in step 7, from the corrected error $r_{ex}$ of the arm-end position and orientation outputted from the position and force control direction selection means 43, a position error correcting output $u_p$ is calculated (processes in the position error compensation means 103). A PID compensator is proposed as a specific example of the position error compensation means 103. In the case of the PID compensator, in step 7, a total value of three values, that is, a value obtained by multiplying the corrected error $r_{ex}$ of the arm-end position and orientation by a proportional gain, a value obtained by multiplying a differential value of the corrected error $r_{ex}$ by a differential gain, and a value obtained by multiplying an integrated value of the corrected error $r_{ex}$ by an integral gain, forms the position error correcting output $u_p$. By appropriately adjusting the three proportional, differential and integral gains, each forming a diagonal matrix of constants, the controlling motion is carried out so as to converge the position error to 0.

Next, in step 8, by multiplying the inverse matrix of the Jacob matrix $J_r$ calculated in step 2, the position error correcting output $u_p$ is converted from the value relating to an error of the arm-end position and orientation into a value $\Delta P_{qe}$ (position error correcting output) relating to an error of the joint angle (processes in the approximation inverse kinematics calculation means 108A).

Next, in step 9, by multiplying the inverse matrix of the Jacob matrix $J_r$, the corrected error $r_{ex}$ of the arm-end position and orientation is converted to a joint angle error $q_e$ (processes in the approximation inverse kinematics calculation means 108B).

Next, in step 10, a value, obtained by adding the joint angle error $q_e$ calculated in step 9 and the current joint angle q measured by each of the encoders 24 (24-1, 24-2, 24-3, 24-4, and 24-5) to each other in the fifth motion unit 84, is set to a desired value $q_d$ of the joint angle so that a desired pressure difference $\Delta P_d$ is calculated in the desired pressure difference calculation means 105.

Next, in step 11, a desired value (desired force vector) $F_d$ of a force exerted between the arm-end supporting member 42 and the supporting surface 90 of the robot arm 101 is calculated by the desired, trajectory calculation means 102.

Next, in step 12, an error $F_e$ corresponding to a difference between the desired value (desired force vector) $F_d$ of a force exerted between the arm-end supporting member 42 and the supporting surface 90 and the current force F is calculated by the second motion unit 81.

Next, in step 13, in the position and force control direction selection means 43, only the component relating a direction to be subjected to force control is extracted from the force error $F_e$ so that a corrected error $F_{ex}$ of the force with the component relating to the direction to be subjected to the position control being set to 0, is outputted.

Next, in step 14, a force error correcting output is calculated from the corrected error of the force (processes in the force error compensation means 44). A PID compensator is proposed as a specific example of the force error compensation means 44. In the case of the PID compensator, in step 14, a total value of three values, that is, a value obtained by multiplying the corrected error $F_{ex}$ of the force by a proportional gain, a value obtained by multiplying a differential value of the corrected error $F_{ex}$ of the force by a differential gain, and a value obtained by multiplying an integrated value of the corrected error $F_{ex}$ of the force by an integral gain, forms the force error correcting output $u_F$. By appropriately adjusting the three proportional, differential and integral gains, each forming a diagonal matrix of constants, the controlling motion is carried out so as to converge the force error to 0.

Next, in step 15, by multiplying a transpose matrix of the Jacob matrix $J_r$ calculated in step 2, the force error correcting output $u_F$ is converted from the value relating to an error of the translation force into a value $\Delta P_{\tau e}$ (force error correcting output) relating to an error of a torque for each of the joints (processes in the force-torque conversion means 45).

Next, in step 16, an internal pressure value P of each of the elastic body actuators 25-1a, 25-1b, 25-2a, 25-2b, 25-3a, 25-3b, 25-4a, 25-4b, 25-5a, and 25-5b, measured by each pressure sensor 110, is captured by the control unit 109 so that the current pressure difference LP between the internal pressures of each of the pairs of the elastic body actuators 25-1a, 25-1b, 25-2a, 25-2b, 25-3a, 25-3b, 25-4a, 25-4b, 25-5a, and 25-5b that are antagonistically driven is calculated by the pressure difference calculation means 104.

Next, in step 17, a value $\Delta P_\tau$, obtained by adding the position error correcting output $\Delta P_{qe}$ calculated in step 8 to the force error correcting output $\Delta P_{\tau e}$ calculated in step 15 in the third motion unit 82, is added to the desired pressure difference $\Delta P_d$ calculated in step 10 in the fourth motion unit 83, and by subtracting the current pressure difference LP calculated in step 16 from the added value in the fourth motion unit 83, a pressure difference error $\Delta P_e$ is calculated.

Next, in step 18, a pressure difference corrected output u is calculated from the pressure difference error $\Delta P_e$ (processes in the pressure difference error compensation means 106). As the pressure difference error compensation means 106, for example, a PID compensator is proposed.

Next, in step 19, the pressure difference corrected output u is given to the respective 5-port flow-rate control electromagnetic valves 17-1, 17-2, 17-3, 17-4, 17-5, and 17-6 through a D/A board 18a of the control computer 18 of the robot arm 101 as a voltage command value so that the 5-port flow-rate control electromagnetic valves 17-1, 17-2, 17-3, 17-4, 17-5, and 17-6 change the pressures inside the elastic body actuators 25-1a, 25-1b, 25-2a, 25-2b, 25-3a, 25-3b, 25-4a, 25-4b, 25-5a and 25-5b; thus, the respective joint axes 19, 20, 21, 22, and 23 of the robot arm 101 are driven to generate rotary motions of the respective joints 71, 72, 73, 74, and 75 so that the robot arm 108 is operated.

The above steps 1 to 19 are repeatedly executed as a controlling calculation loop so that the motion controls of the robot arm 101 are realized.

Figure 8:
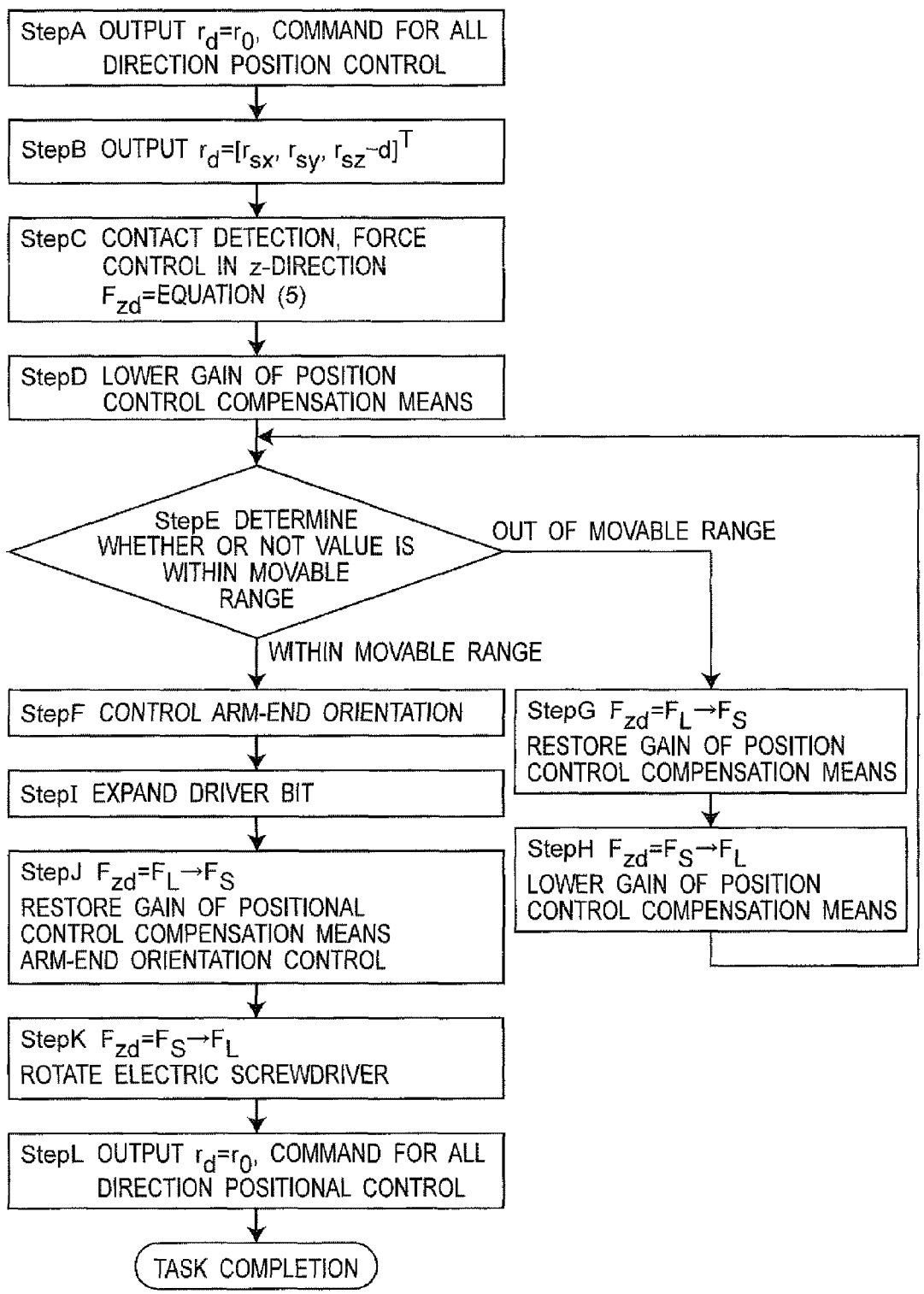
FIG. 8 is a flow chart showing a processing step in a desired trajectory generation means of the robot arm according to the first embodiment of the present invention.

Next, referring to FIG. 8 that is a flow chart of processing steps in the desired trajectory generation means 102 and FIG. 9 that is an explanatory view of the motion of the robot arm 101, actual motions of the robot arm 101 will be described by specifically exemplifying a case where the robot arm 101 carries out a positioning process for removing a screw by using the electric screwdriver 29.

In step A, the desired trajectory generation means 102 outputs an arm-end position and orientation desired vector $r_d$ and a stand-by position and orientation vector $r_{20}$, and outputs the position and force control direction command.

$$S=[1, 1, 1]^T \quad \text{[Expression 17]}$$

Figure 9A:
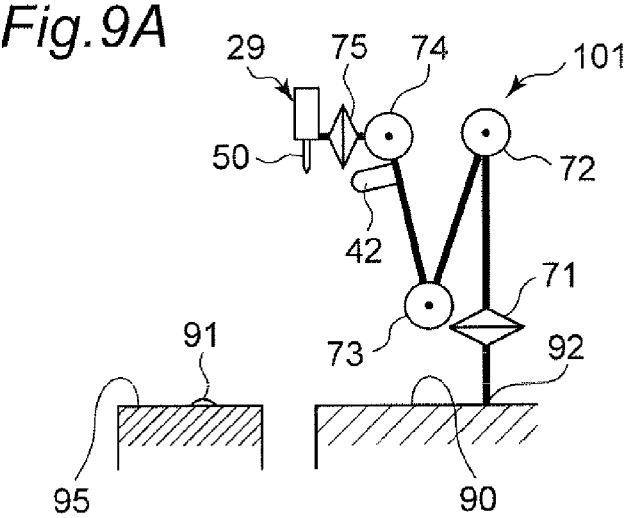
FIG. 9A is an explanatory view of motions of the robot according to the first embodiment of the present invention.

Thus, all the directions are set to a position control mode so that the robot arm 101 is stopped at a stand-by position (FIG. 9A). In this case, the stand-by position also serves as a reference position for the motions of the robot arm 101, at which the electric screwdriver 29 at the arm-end portion of the robot arm 101 is retreated from an operable position at which it is allowed to be made in contact with an object.

Next, in step B, suppose a position and orientation vector $r_s$ of a desired screw head 91 is given by the following expression:

$$[r_{sx}, r_{sy}, r_{sz}]^T \quad \text{[Expression 18]}$$

Then, a position, which is lower than the position and orientation of the screw head 91 by an arbitrary dimension d represented by the following expression, is outputted from the desired trajectory generation means 102 as an arm-end position and orientation desired vector $r_d$.

$$[r_{sx}, r_{sy}, r_{sx}-d]^T \quad \text{[Expression 19]}$$

Then, the following position and force control direction command S is outputted from the desired trajectory generation means 102.

$$S=[1, 1, 1]^T \quad \text{[Expression 20]}$$

Figure 9B:
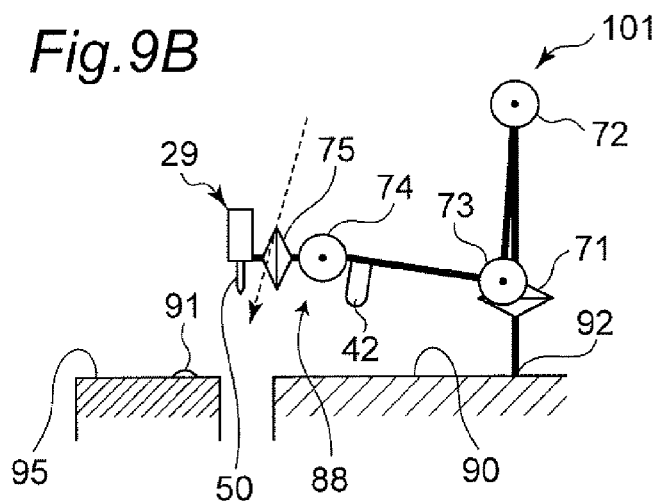
FIG. 9B is an explanatory view of motions of the robot according to the first embodiment of the present invention.

Thus, all the directions are set to a position control mode so that the robot arm 101 moves the electric screwdriver 29 at its arm-end portion to the position and orientation vector $r_a$ of the screw head 91 (FIG. 9B).

In the case where the shape and dimensions of a target object is known (for example, in the case where the position of the screw head 91 is known), the position and orientation vector $r_s$ of a desired screw head 91 may be stored in, for example, a built-in memory of the desired trajectory generation means 102, and can be set by the desired trajectory generation means 102. However, the present invention is not limited to such a case, and in the case where the position of the screw head 91 is retrieved by image recognition and the like from images picked up by a camera placed above the screw head 91 or the like, based upon the image recognition information obtained by the camera, the corresponding vector may be set by the desired trajectory generation means 102.

Next, in step C, since the desired value is defined as a position that is lower than the position and orientation of the screw head 91 by a dimension d, at a point before the position of the screw head 91 (between the position of the screw head 91 and the fixed supporting point (fixed portion) 92 relative to the fixed wall 26 of the first joint axis 19, as well as near the position of the screw head 91), the arm-end supporting member 42 and the supporting surface 90 are made in contact with each other. The contact between the arm-end supporting member and the supporting surface 90 can be detected by a change in the output of the force sensor 51. For example, among changes in the output of the force sensor 51, when the value of the force sensor 51 is located within a permissible range, it is ignored as an error, and when the value of the force sensor 51 is located out of the permissible range, it is determined that the contact has occurred so that the corresponding value can be outputted from the force sensor 51. In this manner, when the contact is detected by the force sensor 51 so that the corresponding value is inputted to the desired trajectory calculation means 102, a position and force control direction command, indicated by the following expression (command that means to carry out a position control in the x-direction, a position control in the y-direction, and a force control in the z-direction), is outputted from the desired trajectory calculation means 102 to the position and force control direction selection means 43.

$$S=[1, 1, 0]^T \quad \text{[Expression 21]}$$

Then, in the position and force control direction selection means 43, the motion in the z-direction is switched to a force controlling motion so that a z-direction component $F_{zd}$ of the force desired value (desired force vector) $F_d$ is outputted based upon the following equation (5):

[Expression 22]

$$F_{zd}=F_L-Kr_{xe} \ldots (r_{xe} \geq 0)$$

$$F_{zd}=F_L \ldots (r_{xe}<0) \quad (5)$$

In this case, $F_L$ and K are constants, and $r_{xe}$ is represented as $r_{xe}=r_{xd}-r_x$, which corresponds to a position error in the x-direction. Here, $r=[r_x, r_y, r_z]^T$ is the current value of the arm-end position, which corresponds to the output of the forward kinematics calculation means 107. Moreover, $r_d=[r_{xd}, r_{yd}, r_{zd}]^T$ is a desired value for the arm-end position, which corresponds to the output of the desired trajectory generation means 102.

Figure 9C:
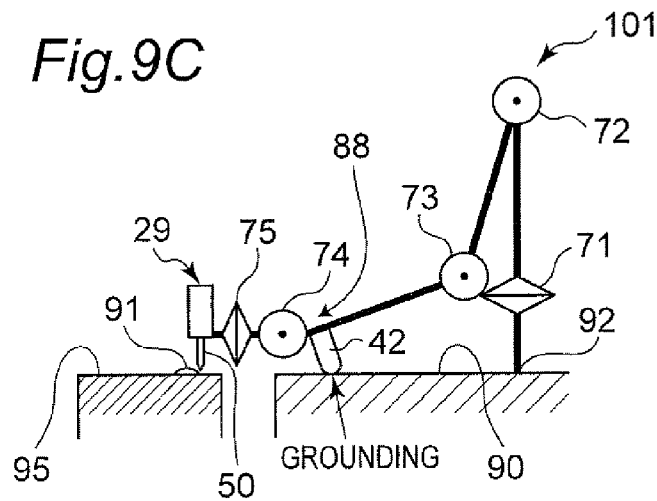
FIG. 9C is an explanatory view of motions of the robot according to the first embodiment of the present invention.

According to equation (5), as the driver bit 50 approaches the position of a desired screw head 91, the z-direction component $F_{zd}$ of the force desired value (desired force vector) $F_d$ becomes greater, making friction between the arm-end supporting member 42 and the supporting surface 90 greater, and a resistant force (frictional force) thus exerted on the robot arm 101 by the friction from the supporting surface serves like a braking force. Accordingly, the motion of the arm-end of the robot arm 101 is decelerated to exert such an effect as to easily stop the arm-end at a position near the screw head 91 and so that the arm-end supporting member 42 is pressed onto the supporting surface 90 to also exert such an effect so as to stabilize the arm-end position (FIG. 9C). In this case, the size of $F_{zd}$ is changed depending on equation (5) and is also altered depending on how to determine the values of $F_L$ and K. Actually, the value of $F_L$ is experimentally determined as such a value so as to allow the robot arm 101 to stop in a stable manner when $F_z=F_L$, and in the case when the error is greater, the values of $F_L$ and K are experimentally determined so as to allow the robot arm 101 to smoothly move sufficiently when $F_{zd}=F_L-Kr_{xe}$.

Figure 9D:
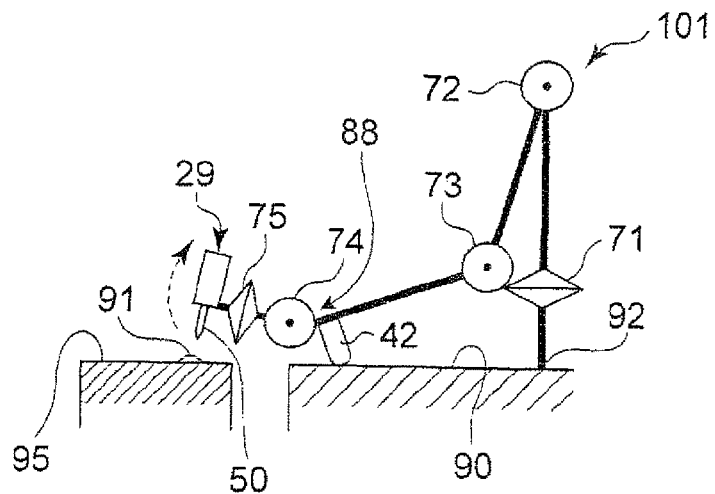
FIG. 9D is an explanatory view of motions of the robot according to the first embodiment of the present invention.

Next, in step D, a velocity |dr/dt| of the arm-end of the robot arm 101 is calculated in the desired trajectory generation means 102, and when the value becomes smaller than the preset threshold value, the desired trajectory generation means 102 determines that the arm-end of the robot arm has been decelerated sufficiently so that the gains in the x-direction, y-direction, and z-direction of the position error compensation means 103 are lowered to gain values for use in the arm-end orientation control (FIG. 9D). The gain values for use in controlling the arm-end orientation are set to such gain values as to allow the arm-end position to stop in a stable manner so as not to give influences to the arm-end orientation control since, when the gain values are high, the arm-end position moves beyond the frictional force by the arm-end supporting member 42 in an attempt to reach the desired position, and therefore the values are preliminarily determined through experiments.

Figure 9E:
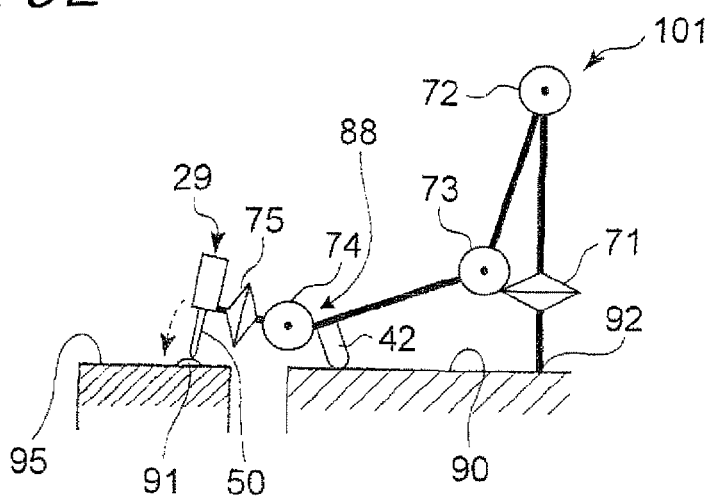
FIG. 9E is an explanatory view of motions of the robot according to the first embodiment of the present invention.

Next, in step E, the desired trajectory generation means 102 determines whether or not the tip of the driver bit 50 of the electric screwdriver 29 can be brought to the position of the screw head 91 by controlling arm-end orientations ($r_\theta$, $r_\psi$), that is, whether or not the tip thereof is located within a movable range of the arm-end orientations ($r_\theta$, $r_\psi$) (FIG. 9E).

In this case, $r_\theta$ represents a pitch angle that corresponds to an angle made by the driver bit 50 relative to the xy plane. Moreover, $r_\psi$ represents a yaw angle that corresponds to a joint angle of the fifth joint 75.

In the case where the position of the screw head 91 is known, since the determination as to whether or not the tip thereof is located within the movable range of the arm-end orientations ($r_\theta$, $r_\psi$) can be made by the desired trajectory generation means 102 since the tip position of the driver bit 50 can be obtained by geometrical calculation from the arm-end position and orientation vector r. In the case where the position of the screw head is not known, the position of the screw head 91 is obtained by image recognition as described earlier.

In the case where the desired trajectory generation means 102 has determined that the tip thereof is located within the movable range in step E, the sequence proceeds to step F, and switching is made so as to control the orientation ($r_\theta$, $r_\psi$) of the driver bit 50 of the electric screwdriver 29 of the arm-end portion by the desired trajectory generation means 102, and the tip of the driver bit 50 of the electric screwdriver 29 is directed to the screw head 91 by the control of the arm-end orientation ($r_\theta$, $r_\psi$) so that, after a predicted arrival position at the time of extension of the driver bit 50 has become within, for example, ±0.5 mm (this value differs depending on the size of the screw to be used, and determined by experiments), the sequence proceeds to step I (see FIG. 9D).

In contrast, in the case where the desired trajectory generation means 102 has determined that the tip thereof is located out of the movable range in step E, the sequence proceeds to step G, and switching is made so as to set the z-direction component $F_{zd}$ of the force desired value (desired vector) $F_d$ to a value $F_s$ smaller than the constant $F_L$ (such a small value as to make the frictional force by the arm-end supporting member 42 smaller so as to allow the arm-end position of the robot arm to be sufficiently movable, that is, for example $F_a=0$); thus, the friction between the arm-end supporting member 42 and the supporting surface 90 is made smaller so that the driver bit 50 of the electric screwdriver 29 serving as the arm-end is easily moved, while the gains in the x-direction, y-direction, and z-direction of the position error compensation means 103 are returned to the gain values at the time of the position controlling motion in step A, and so that the controlling motions of ($r_x$, $r_y$, $r_z$), that is, the position controlling motions are carried out in a very short period of time Δt (for example, 0.5 sec) so as to operate the tip of the driver bit 50 of the electric screwdriver 29 of the arm-end portion to approach the screw head 91.

After step G, in step H, after a lapse of time Δt, the desired trajectory generation means 102 switches the z-direction component $F_{zd}$ of the force desired value (desired force vector) $F_d$ from the value $F_s$ to the constant $F_L$, and also reduces the gains in the x-direction, y-direction, and z-direction of the position error compensation means 103, and the sequence then returns to step E.

In step I, the pneumatic cylinder mechanism 29B that is built-in the electric screwdriver 29 extends the driver bit 50 (shifts the driver bit 50 so as to allow the lower end thereof to further stick out from the case of the electric screwdriver 29) so that the tip of the driver bit 50 is inserted to a screw groove (cross-shaped groove, or minus groove, or the like) of the screw head 91 (FIG. 9E).

Figure 9F:
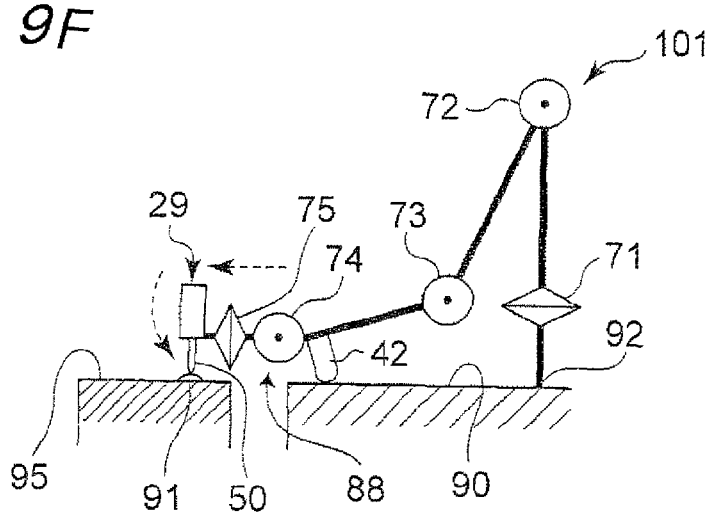
FIG. 9F is an explanatory view of motions of the robot according to the first embodiment of the present invention.

After step I, in step J, the desired trajectory generation means 102 switches the z-direction component $F_{zd}$ of the force desired value (desired force vector) $F_d$ to a value $F_s$ smaller than the constant $F_L$ (such a small value as to make the frictional force by the arm-end supporting member 42 smaller so as to allow the arm-end position of the robot arm to be sufficiently movable, that is, for example $F_s=0$) so that the friction between the arm-end supporting member 42 and the supporting surface 90 is made smaller so as to allow the driver bit 50 of the electric screwdriver 29 corresponding to the arm-end to easily move, and also to return the gains an the x-direction, y-direction, and z-direction of the position error compensation means 103 to the gain values at the time when the position control of step A was carried out, thereby correcting the position and orientation of the driver bit 50 of the electric screwdriver 29 corresponding to the arm-end so as to carry out controlling motions of ($r_x$, $r_y$, $r_z$, $r_\theta$, $r_\psi$), that is, so as to allow the axis direction of the driver bit 50 to be conformed to the axis direction of the screw by a cooperative control of the position and orientation (in other words, so as to make the axis direction of the driver bit 50 perpendicular to the lower surface (mount surface) of the screw head 90) (FIG. 9F).

Next, in step K, the desired trajectory generation means 102 switches the z-direction component $F_{zd}$ of the force desired value (desired force vector) $F_d$ to the constant $F_L$ from the value $F_s$, and the pressing force of the arm-end supporting member 42 onto the supporting surface 90 is increased so that the tip of the driver bit 50 is held so as not to be removed from the screw groove of the screw head 91. Next, the driver bit 50 of the electric screwdriver 29 is rotated so that the head 91 of the screw is removed from the object to which the screw is attached. In this case, a period of time required for removing the screw, that is, a period in which, after the rotation of the screw for a certain period or more, the screw is reliably removed, is preliminarily found through experiments, and a predetermined driving time is set so as to drive the driver bit 50 only for the time required for removing the screw, thereby making it possible to remove the screw. After the driver bit 50 has been rotated for the predetermined time (after the screw has been removed), the sequence proceeds to step L.

Next, in step L, the desired trajectory generation means 102 outputs the stand-by position and orientation vector $r_0$, as an arm-end position and orientation vector $r_d$, and also outputs the following position and force control direction command.

$$S=[1, 1, 1]^T \qquad \text{[Expression 23]}$$

Then, all the directions are returned to position controlling motions, and the robot arm 101 is returned to the stand-by position to be stopped, thereby completing a sequence of motions (FIG. 9A).

With respect to the motions shown in FIGS. 9A to 9F, the timings of motions of the respective joints 71 to and the electric screwdriver 29 are summarized in a chart in FIG. 12.

As described above, according to the robot arm 101 of the first embodiment of the present invention, the arm-end supporting member 42 is installed on the base side near the wrist portion 88 of the robot arm 101 from the wrist portion 88, and the control unit (control device) 109 serving as one example of contact motion control means is also installed so that the arm-end portion of the robot arm 101 can be mechanically supported by the arm-end supporting member 42, and by operating the control unit 109 so as to press the arm-end supporting member 42 onto the supporting surface 90, the arm-end position of the robot arm 101 can be stabilized. That is, the control unit 109 first allows the arm-end supporting member 42 to be made in contact with the supporting surface 90 of the robot arm 101 so as to support the arm-end portion of the robot arm 101, and then controls the position and orientation of the arm-end portion of the robot arm 101 so that the robot arm 101 is controlled to carry out a predetermined desired task. Moreover, by controlling the friction between the arm-end supporting member 42 and the supporting surface 90 so as to carry out a contact motion control by the control unit 109, the arm-end motion can be decelerated abruptly so that it is allowed to reach a desired position in a shorter period of time. Moreover, the arm-end supporting member 42 is only required to be made in contact with the supporting surface 90, and no structure is required for surrounding a target object and for enclosing the target object so that, not limited to a specific motion, the robot arm can be applicable to many tasks. Furthermore, since an arrangement is made so as to install the arm-end supporting member 42 on the base side near the wrist portion 88 from the wrist portion 88 and to press the arm-end supporting member 42 onto the supporting surface 90, the distance from the arm-end supporting member 42 to the arm-end is made shorter in comparison with the arrangement in which the elbow portion (the portion of the third joint 73) is pressed onto the supporting surface 90 (in other words, the distance from the elbow portion to the arm-end is shorter than the distance from the wrist portion 88, to which the arm-end supporting member 42 is attached, to the arm-end). For this reason, in comparison with the structure in which the elbow portion (the portion of the third joint 73) is pressed onto the supporting surface 90, the structure of the present embodiment in which the arm-end supporting member 42 of the wrist portion 88 is pressed onto the supporting surface 90 can provide a more stable motion, and the degree of freedom of the wrist portion 88 is greater in the arm-end side than in the arm-end supporting member 42 so that, while the arm-end is kept stable by the arm-end supporting member 42, the degree of freedom of the wrist portion 88 is exerted to change the orientation of the arm-end so that it is possible to widen the application range of tasks.

By using the effects described above, even in the case of a robot arm 101 that is driven by elastic body actuators 25-1a, 25-1b, 25-2a, 25-2b, 25-3a, 25-3b, 25-4a, 25-4b, 25-5a, and 25-5b such as pneumatic artificial muscles, motions at high speed and with high position control precision can be carried out, tasks required for high precision, such as assembling tasks, or tasks such as a disassembling task of an assembled structure 95 in which the axis directions of screws are not aligned in a fixed direction can be generally achieved; thus, it is possible to provide a robot that is flexible and has intrinsic stability, with high precision, that is, a robot arm and a control device thereof.

Second Embodiment

Figure 13:
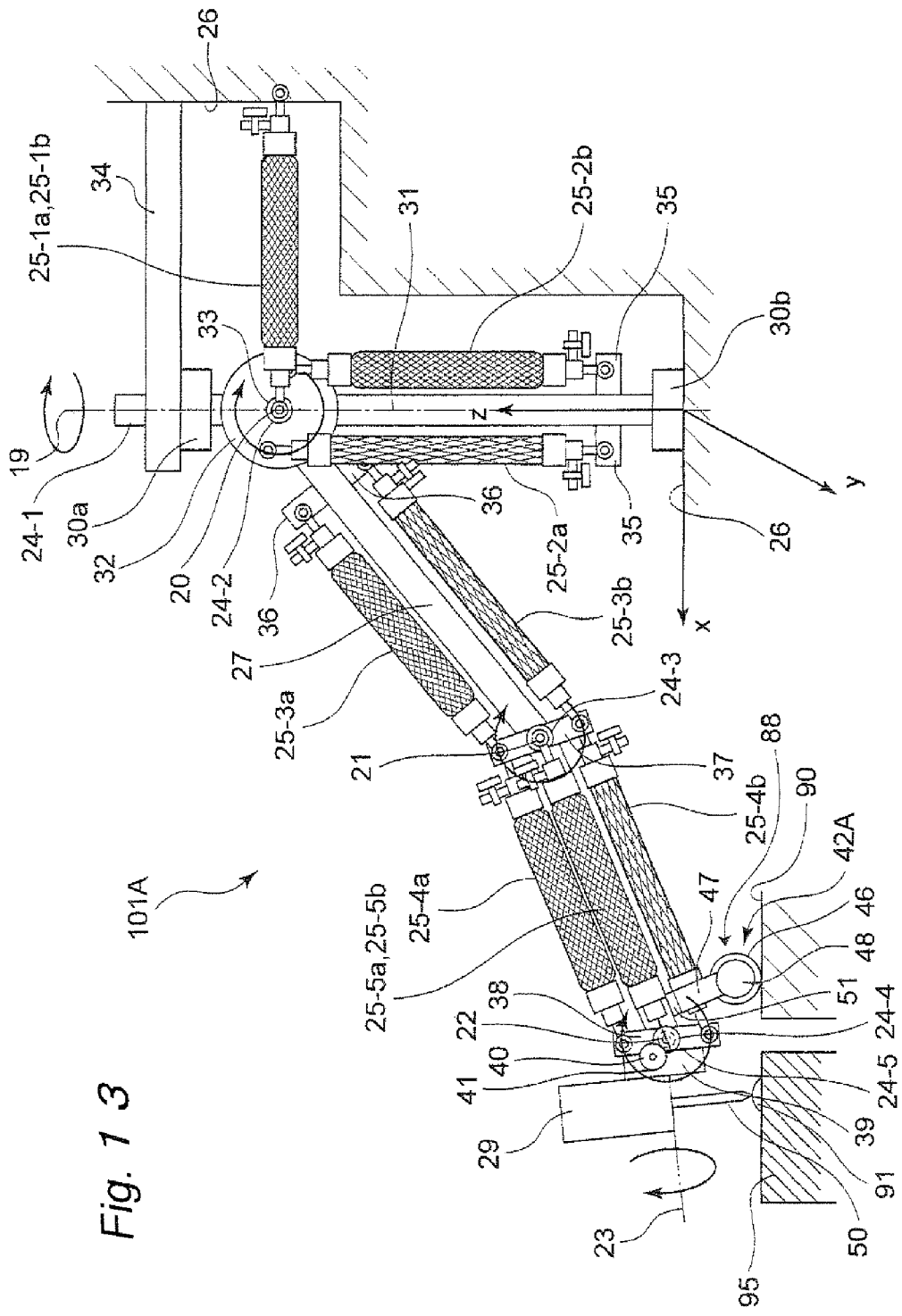
FIG. 13 is a view showing a structure of a robot arm according to a second embodiment of the present invention.

FIG. 13 is a view showing the structure of a robot arm 101A according to a second embodiment of the present invention. The robot arm 101A of FIG. 13 is different from the first embodiment in a structural portion to be described below, and the other portions are the same as those of the first embodiment; therefore, those common structural portions are denoted by the same reference numerals as those of the first embodiment, and the detailed description thereof will not be given.

In FIG. 13, an arm-end supporting member 42A is constituted by a pair of wheels 46, a wheel-shaft supporting mechanism 47 that supports a wheel shaft to which the paired wheels 46 are secured so as to freely rotate thereon, and a wheel-driving motor 48 that drives the paired wheels 46 to forwardly/reversely rotate, with its rotary shaft being coupled to the wheel shaft. The wheels 46 are not limited to the paired wheels, and one wheel may be used as long as a stable supporting motion is obtained. The wheel-shaft supporting mechanism 47 is secured to a second arm 28 through a force sensor 51, and a force is detected by the force sensor 51 so that the force by which the wheel-shaft supporting mechanism 47 and the supporting surface 90 are made in contact with each other is controlled, and the paired wheels 46 can be subsequently prevented from being pressed onto the supporting surface 90 too hard to disturb a smooth traveling motion.

Figure 14:
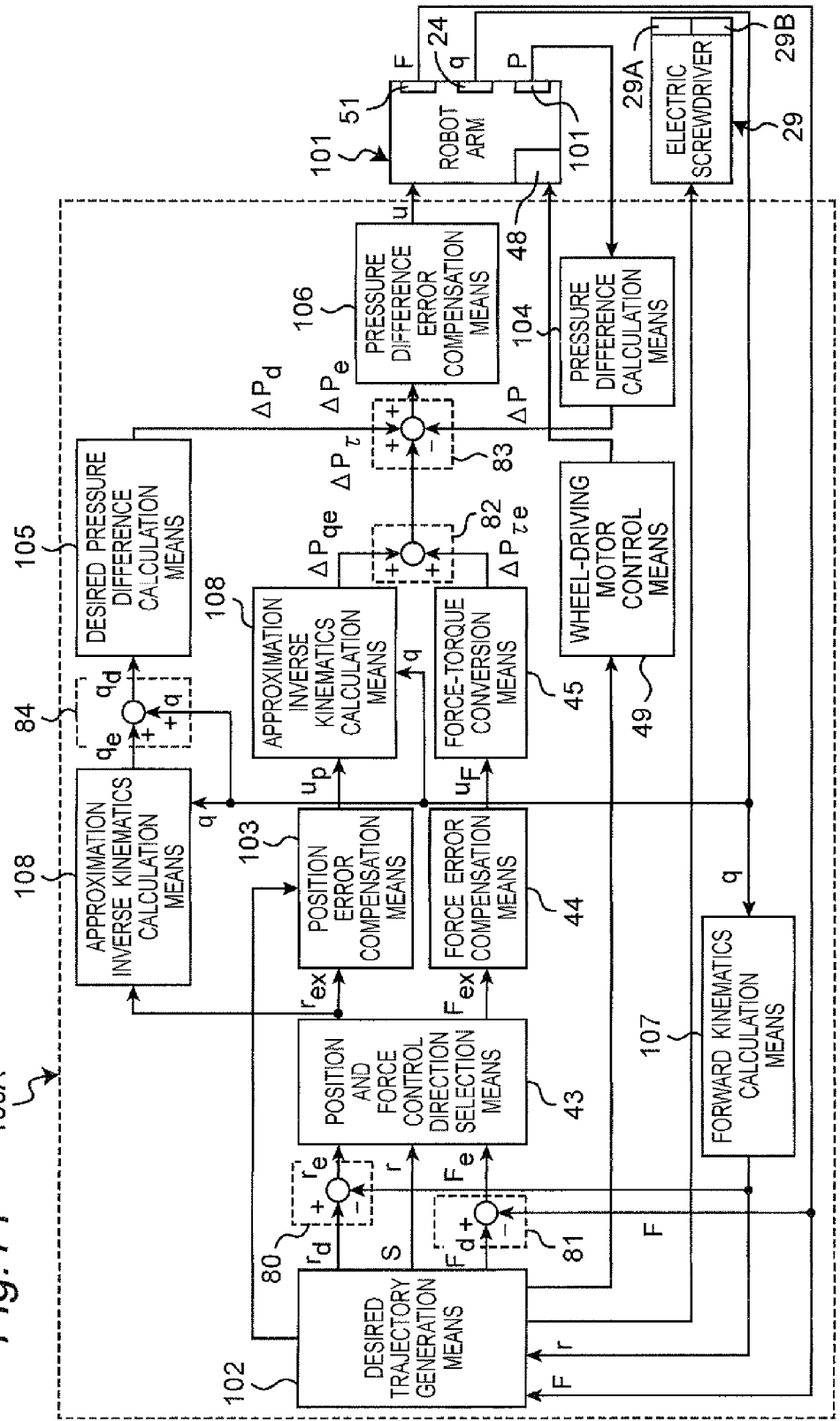
FIG. 14 is a view showing a structure of a control device according to the second embodiment of the present invention.

Moreover FIG. 14 is a block diagram showing a structure of a control unit 109A of the robot arm 101A in the second embodiment. In FIG. 14, reference numeral 49 denotes a wheel-driving motor control means. Upon receipt of a command from the desired trajectory generation means 102, the wheel-driving motor control means 49 allows the wheel-driving motor 48 to drive the paired wheels 46 of the arm-end supporting member 42A to forwardly/reversely rotate.

Figure 15:
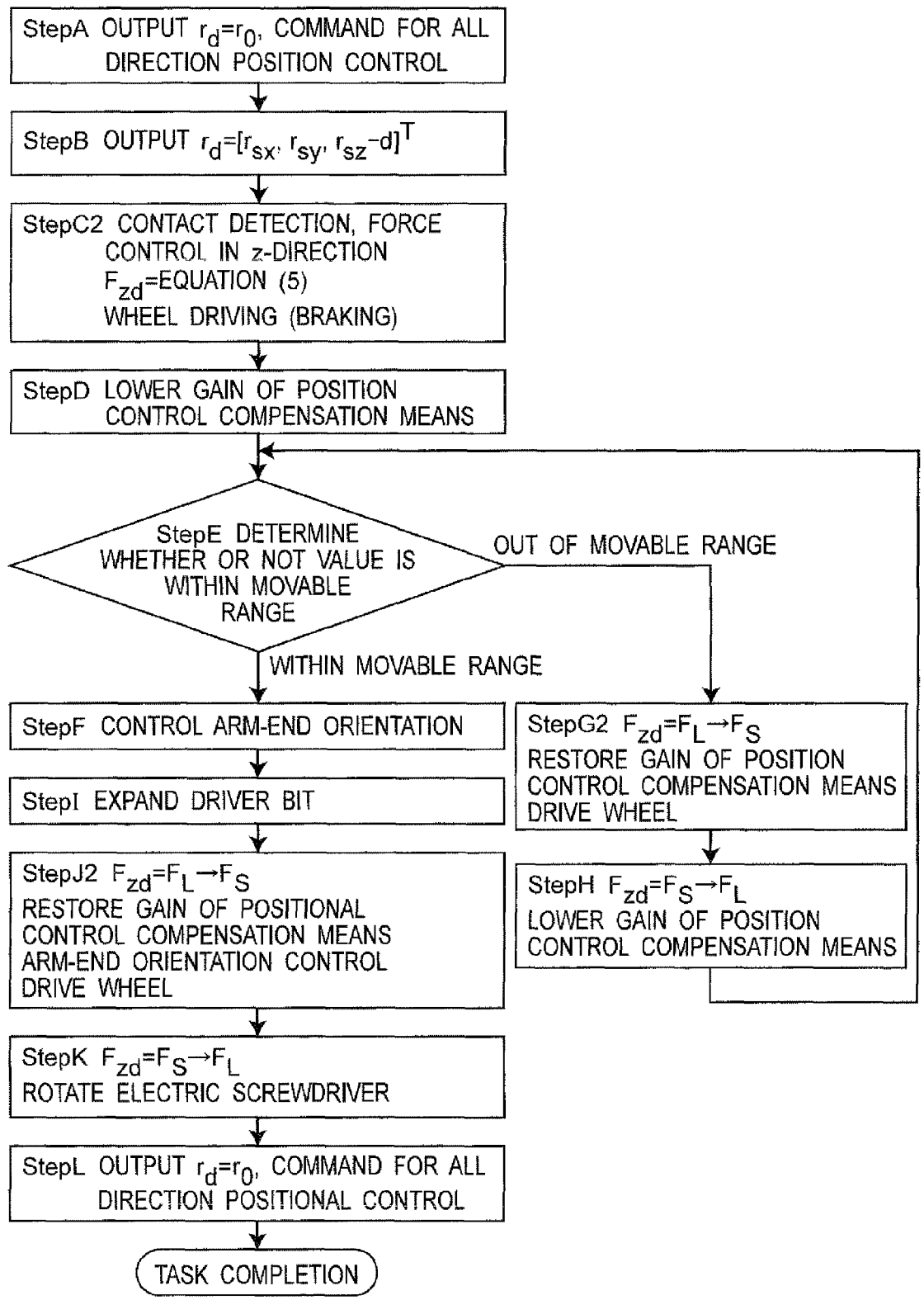
FIG. 15 is a flow chart showing a processing step in a desired trajectory generation means of the robot arm according to the second embodiment of the present invention.

Next, referring to a flow chart of FIG. 15, a description will be given of motions of the robot arm 101A according to the second embodiment. The motions of the robot arm 101A according to the second embodiment are different from those of the first embodiment in steps to be described below, and the other steps are the same as those of the first embodiment. Therefore, the common steps are denoted by the same reference numerals, and detailed descriptions thereof will not be given.

Figure 16A:
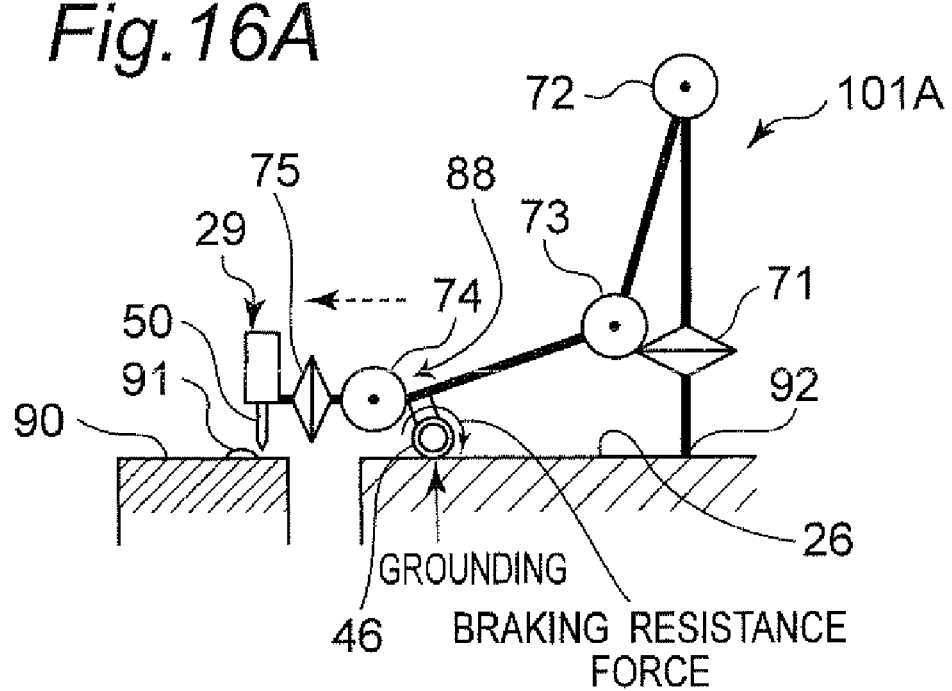
FIG. 16A is an explanatory view of motions of the robot according to the second embodiment of the present invention.

In step C2 that replaces step C, a reverse electromotive force is applied to the wheel-driving motor 48 of the arm-end supporting member 42 so that by generating a braking effect by the rotation resistance of the wheels 46, an abrupt deceleration of the arm-end of the robot arm 101A is assisted (FIG. 16A corresponding to FIG. 9C).

In step G2 that replaces step G, the wheel-driving motor 48 of the arm-end supporting member 42A is driven so that by rotating the wheels 46, the movement of the arm-end of the robot arm 101A is assisted.

Figure 16B:
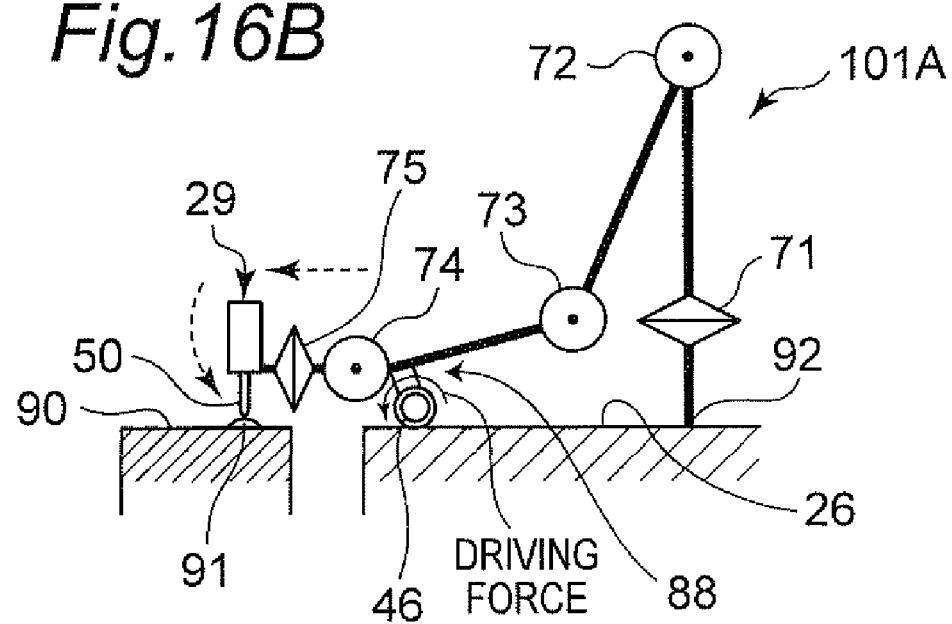
FIG. 16B is an explanatory view of motions of the robot according to the second embodiment of the present invention.

In step J2 that replaces step J, the wheel-driving motor 48 of the arm-end supporting member 42A is driven so that by rotating the wheels 46, the movement of the arm-end of the robot arm 101A is assisted (FIG. 16B corresponding to FIG. 9F).

As described above, according to the robot arm 101A of the second embodiment, the arm-end supporting member 42A including the wheels 46, the wheel-shaft supporting mechanism 47, and the wheel-driving motor 48 is installed on the base side near the wrist portion 88 of the robot arm 101A from the wrist portion 88 so that by driving the wheels 46, an abrupt deceleration or the movement of the arm-end along the supporting surface 90 is assisted, and it becomes possible to carry out motions at high speed with high precision. In particular, from the motion characteristic of the wheels 46, this arrangement is effectively used for a task that carries out a linear movement.

Third Embodiment

Figure 17:
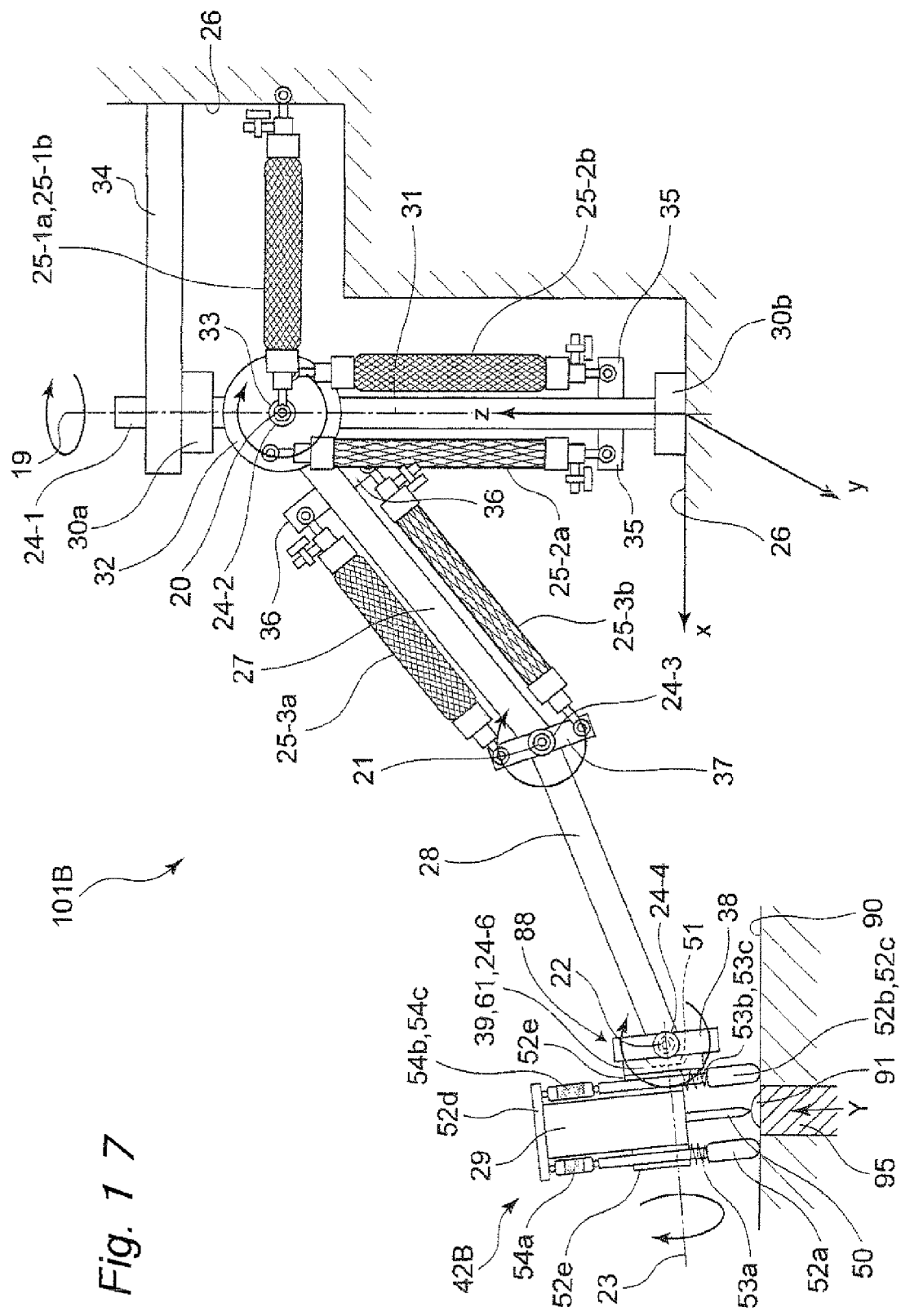
FIG. 17 is a view showing a structure of a robot arm according to a third embodiment of the present invention (from which an elastic body actuator in a second arm is omitted for simplicity of the figure)

FIG. 17 is a view showing the structure of a robot arm 101B according to a third embodiment of the present invention. This robot arm 101E of FIG. 17 is different from the first embodiment in a structural portion to be described below, and the other portions are the same as those of the first embodiment. Therefore, those common structural portions are denoted by the same reference numerals as those of the first embodiment, and the detailed description thereof will not be given.

Figure 18:
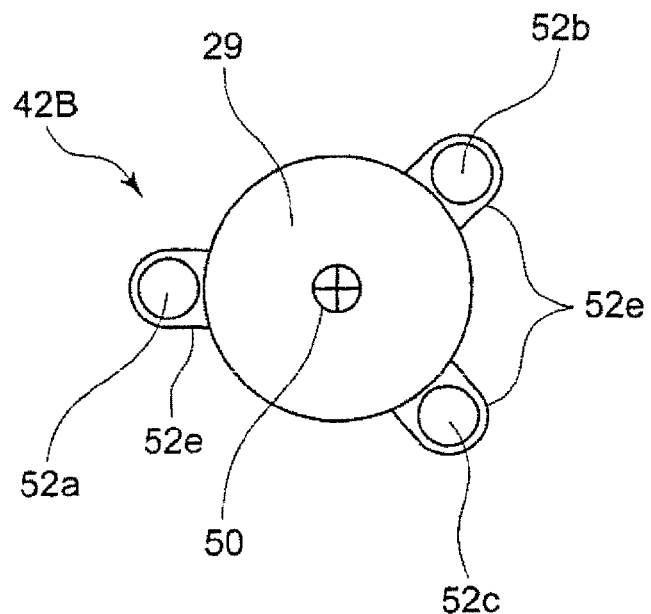
FIG. 18 is a view showing a structure of an arm-end supporting member of the robot arm according to the third embodiment of the present invention.
Figure 19A:
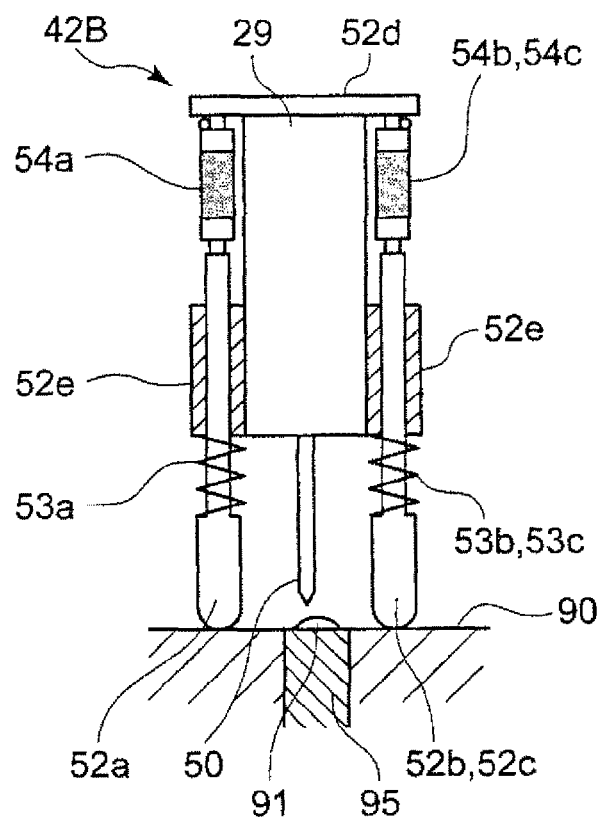
FIG. 19A is a view that describes motions of the arm-end supporting member of the robot arm according to the third embodiment of the present invention.
Figure 19B:
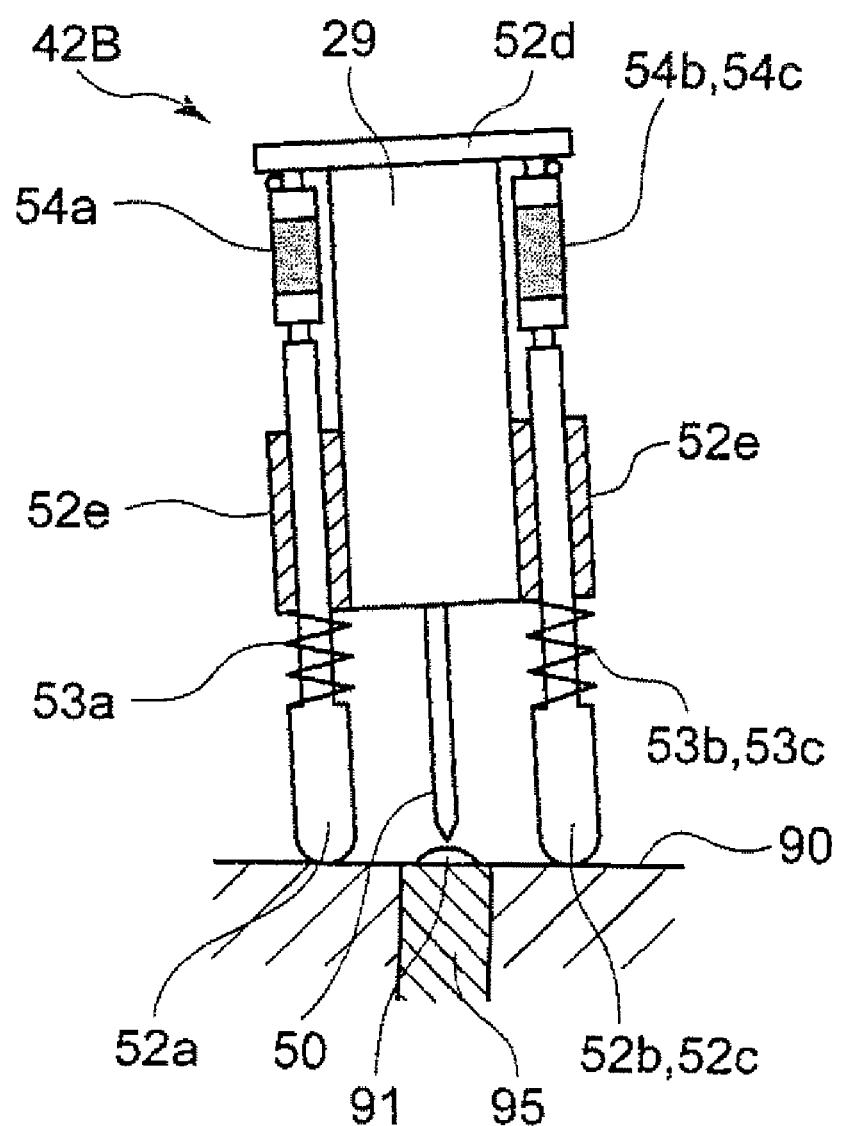
FIG. 19B is a view that describes motions of the arm-end supporting member of the robot arm according to the third embodiment of the present invention.

In FIGS. 17 to 19B, an arm-end supporting member 42B is provided with three supporting legs 52a, 52b, and 52c, and the three supporting legs 52a, 52b, and 52c are disposed around the electric screwdriver 29 placed on the arm-end portion of the robot arm 101B. In FIGS. 17, 19A, and 19B, the arrangement of the supporting legs 52a, 52b, and 52c are drawn as a plan view for sake of simplicity; however, actually, as shown in FIG. 18 that is a drawing in which the arm-end supporting member 423 is viewed in an arrow Y direction, the supporting legs 52a, 52b, and 52c are disposed on a circumference with three equal intervals. The arm-end supporting member 423 is secured on the second arm 28, with a force sensor 51 being interposed therebetween, so that by detecting a force by the force sensor 51, the force by which the arm-end supporting member 42B and the supporting surface 90 are made in contact with each other is preferably controlled.

To the supporting legs 52a, 52b, and 52c, supporting leg springs 53a, 53b, and 53c, as well as supporting leg driving artificial muscles 54a, 54b, and 54c are attached. The upper ends of the supporting leg driving artificial muscles 54a, 54b, and 54c are secured to a fixed plate 52d secured to the upper end of the arm-end supporting member 42B. The lower ends of the supporting leg driving artificial muscles 54a, 54b, and 54c are respectively coupled to the upper ends of the supporting legs 52a, 52b, and 52c. A small diameter portion of each of the upper portions of the supporting legs 52a, 52b, and 52c is allowed to penetrate the inside of each of three guide tubes 52e secured to the side portion of the arm-end supporting member 42B so as to freely move therein. Supporting leg springs 53a, 53b, and 53c are placed in a compressed manner between the guide tubes 52e and large diameter portions of the lower portions of the supporting legs 52a, 52b, and 52c. Therefore, when an air pressure is applied so that the supporting leg driving artificial muscles 54a, 54b, and 54c are contracted, the supporting legs 52a, 52b, and 52c are contracted toward the fixed plate 52d side (raised), while when the air pressure is reduced so that supporting leg driving artificial muscles 54a, 54b, and 54c are expanded, the supporting legs 52a, 52b, and 52c are expanded toward the fixed plate 52d side (lowered). By independently controlling the driving motions of the supporting leg driving artificial muscles 54a, 54b, 54c, the amount of contraction of each of the three supporting legs 52a, 52b, and 52c is controlled so that, as shown in FIGS. 19A and 19B, the orientation (slanting angle of the driver bit 59 in the axial direction) of the driver bit 59 can be changed so that, for example, motions of the orientation of the arm-end of the step can be executed. More specifically, when a screw is being driven into the upper surface of the assembled structure in a tilted manner, the amounts of contraction of the three supporting legs 52a, 52b, and 52c are controlled so as to allow the axial direction of the driver bit 59 to be conformed with the axial direction of the screw relative to the upper surface of the assembled structure so that the screw is reliably rotated by the driver bit 59 to be loosened.

For example, in the same manner as in the pneumatic artificial muscles 25 forming the respective elastic body actuators, by controlling the respective driving motions of the supporting leg driving pneumatic artificial muscles 54a, 54b, and 54c from the air pressure supply source 15 through the air pressure adjusting unit 16 and a 5-port flow-rate control electromagnetic valve 17, the above-mentioned motion controls can be carried out.

According to the structure of the arm-end supporting member 42 according to the third embodiment of the present invention, the orientation of the electric screwdriver 29 is greatly changed even by a slight contraction/expansion motion of each of the supporting legs 52a, 52b, and 52c so that the orientation controlling motion can be carried out at high speed.

Additionally, in the third embodiment, three supporting legs 52a, 52b, and 52c are placed; however, the present invention is not limited thereto, and at least two supporting legs that can be expanded/contracted may be used.

Fourth Embodiment

FIG. 20 is a view showing the structure of a robot arm 101C according to a fourth embodiment of the present invention. The robot arm 101C of FIG. 20 is different from the first embodiment in a structural portion to be described below, and the other portions are the same as those of the first embodiment. Therefore, those common structural portions are denoted by the same reference numerals as those of the first embodiment, and the detailed description thereof will not be given.

Figure 21:
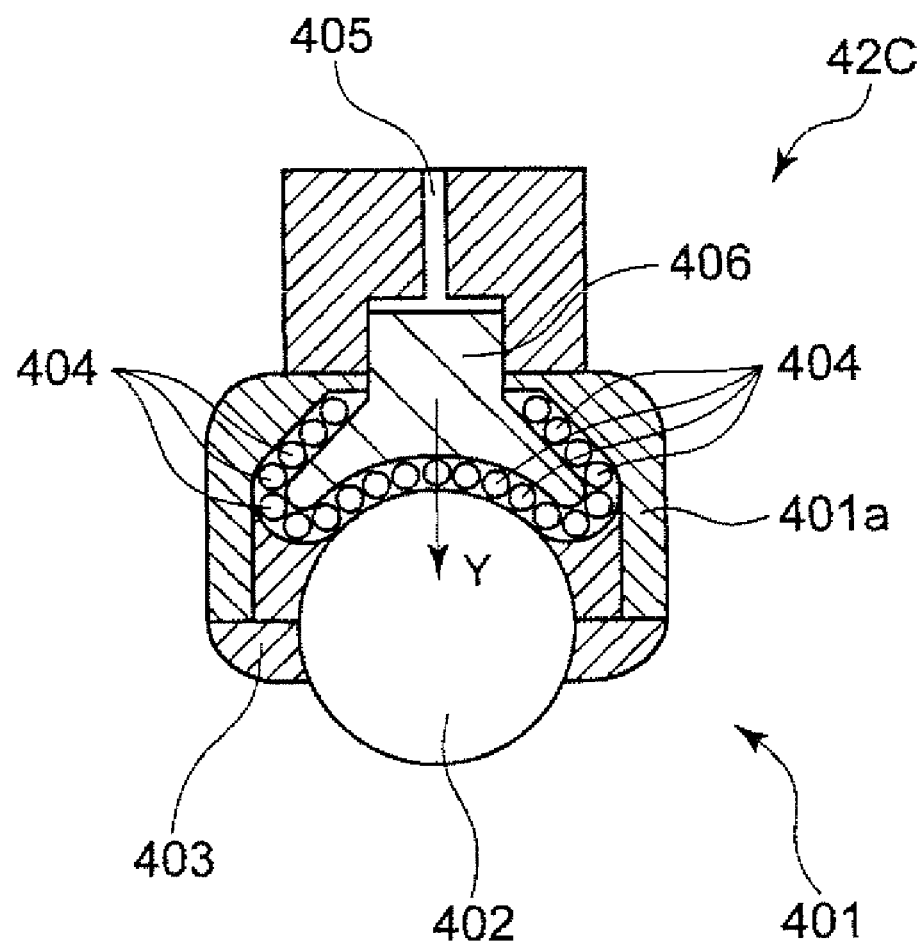
FIG. 21 is a cross-sectional view showing a structure of a ball caster serving as an arm-end supporting mechanism of the robot arm according to the fourth embodiment of the present invention.

In FIG. 20, an arm-end supporting member 42C is formed by a ball caster 401. The ball caster 401 has a structure, shown in FIG. 21, and when a spherical main ball 402, housed in a lower portion of a casing 401c of the ball caster 401, is grounded to the supporting surface 90, a fine gap is formed between a brake shoe that is disposed on a lower portion of the casing 401c to cover the periphery of the lower surface of the main ball 402 and the main ball 402. As a result, a large number of sub-balls 404, which are placed in the inside of a middle portion of the casing 401c, between a receiving seat 406 and the main ball 402 so as to freely move therein, and made in contact with the upper portion of the main ball 402, are allowed to roll so that the main ball 402 can smoothly roll without causing friction. In contrast, when high-pressure air is supplied to a pressure-applying hole 405 of the upper end of the casing 401c, the receiving seat 406 inside the casing 401c is shifted in a Y-direction of FIG. 21 so that the main ball 402 is pressed onto the brake shoe 403, braking the main ball 402, with the result that resistance is generated against the rolling main ball 402. As the mechanism for supplying high-pressure air to the pressure-applying hole 405, for example, by controlling the respective driving motions from the air pressure supply source 15 through the air pressure adjusting unit 16 and a 5-port flow-rate control electromagnetic valve 17, the above-mentioned motion controls can be carried out, in the same manner as in the pneumatic artificial muscles 25.

According to the robot arm 101c of the fourth embodiment, by providing the arm-end supporting member 42c formed by the ball caster 401, the arm-end portion is supported by the arm-end supporting member 42C, and an abrupt deceleration of the arm-end portion can be achieved by the braking effect of the main bail 402 so that it becomes possible to carry out motions at high speed with high precision.

In comparison with the arm-end supporting member 42A of the wheel-type according to the second embodiment, the arm-end supporting member 42C by the use of the ball caster 401 according to the fourth embodiment is characterized in that the above-mentioned effects can be exerted relative to movements in two dimensional directions of xy axes that are orthogonal to each other along the surface of the supporting surface 90. The robot arm 101B according to the fourth embodiment also achieves the same functions and effects as those in the other embodiments.

Fifth Embodiment

Figure 22:
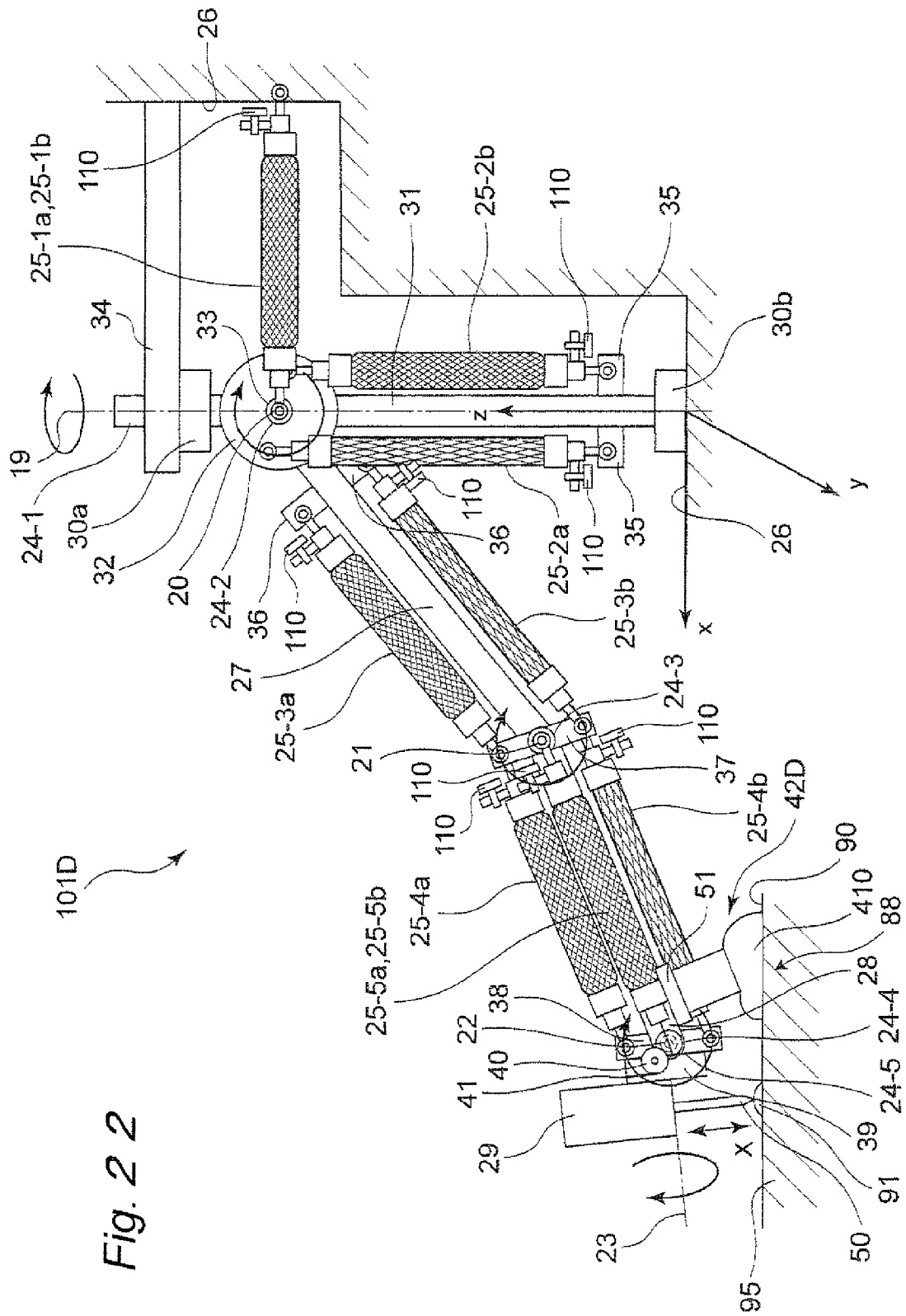
FIG. 22 is a view showing a structure of a robot arm according to a fifth embodiment of the present invention.

FIG. 22 is a view showing the structure of a robot arm 101D according to a fifth embodiment of the present invention. The robot arm 101D of FIG. 22 is different from the first embodiment in a structural portion to be described below, and the other portions are the same as those of the first embodiment. Therefore, those common structural portions are denoted by the same reference numerals as those of the first embodiment, and the detailed description thereof will not be given.

In FIG. 22, an arm-end supporting member 42D is prepared as a sucker 410 made of an elastic member such as rubber. By generating a negative pressure inside the sucker 410, the sucker 410 is allowed to adhere to the floor surface serving as the supporting surface 90 so that the arm-end portion of the robot arm 101D can be secured thereon. In contrast, by generating a positive pressure inside the sucker 410, the suction state of the sucker 410 is cancelled so that the sucker 410 is allowed to float above the floor surface serving as the supporting surface 90, thereby allowing the arm-end portion of the robot arm 101D to freely move so that motions as the arm-end supporting member 42D can be carried out.

Figure 26:
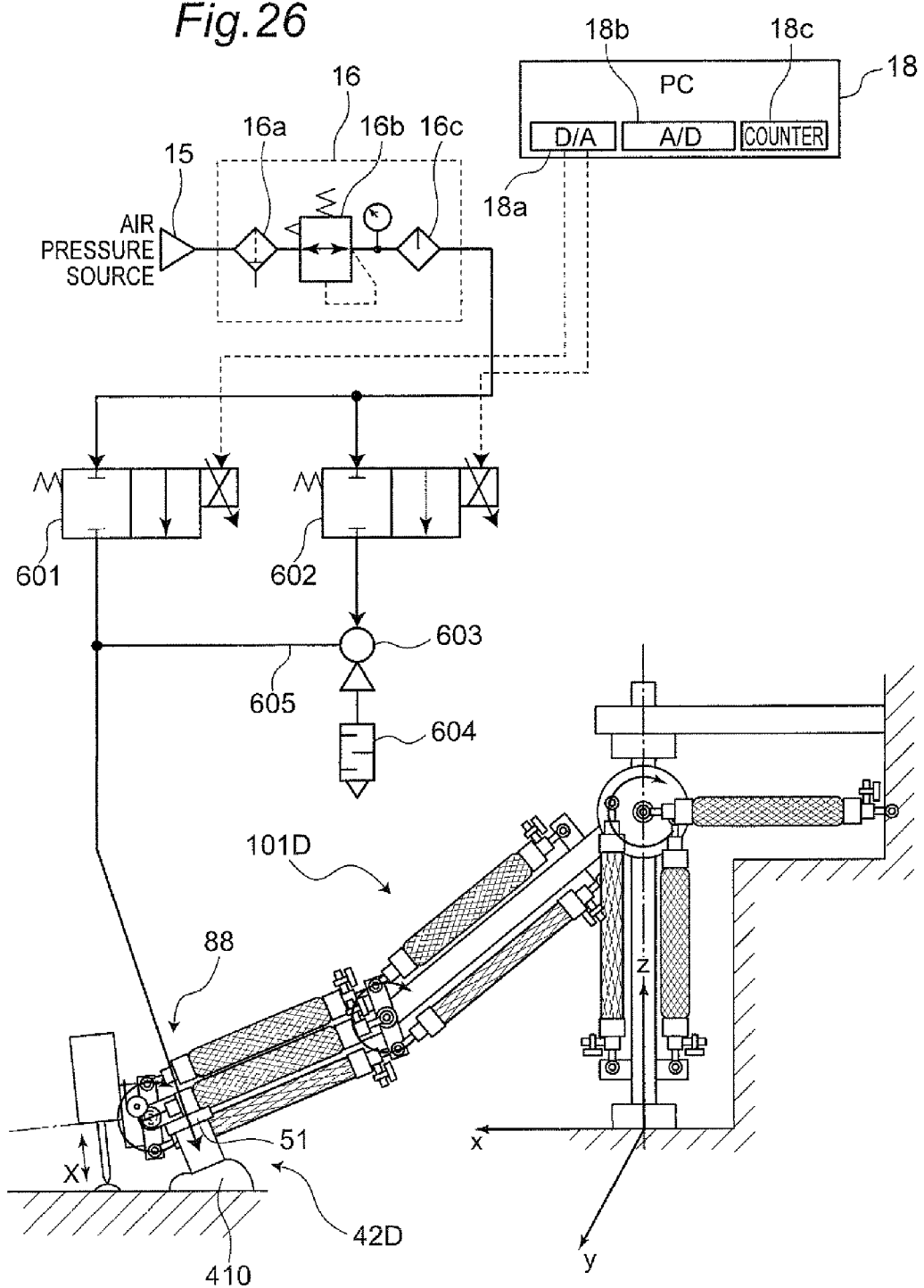
FIG. 26 is a view showing an air pressure system used for controlling an inside of a sucker that is one example of the arm-end supporting member of the robot arm into a negative pressure or a positive pressure, according to the fifth embodiment of the present invention.
Figure 27:
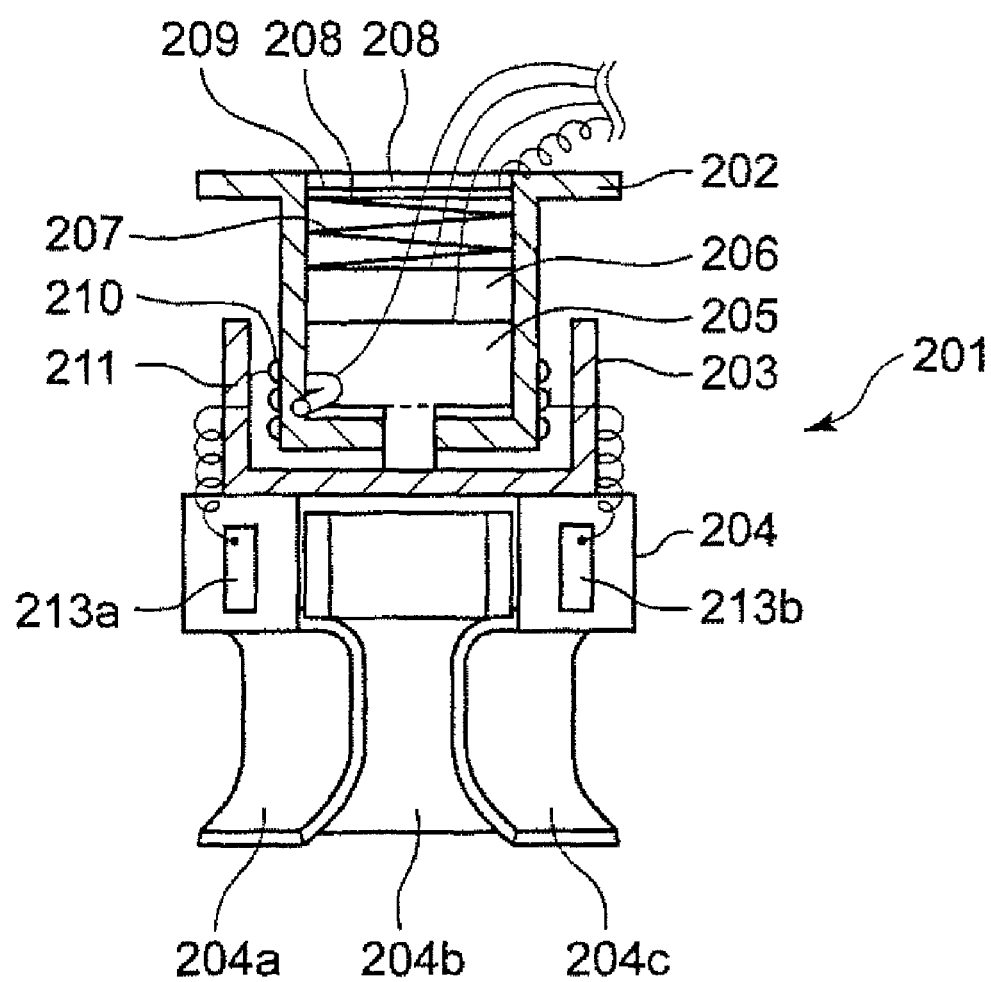
FIG. 27 is a view showing a conventional art.

FIG. 26 shows an air pressure system for use in controlling the inside of the sucker 410 serving as an example of the arm-end supporting member 42 to a negative pressure or a positive pressure. In FIG. 26, only portions required for controlling the sucker 410 are described, and those portions for use in driving the elastic body actuators are omitted because they are the same as those of the first embodiment.

Reference numeral 601 denotes a first 2-port flow-rate proportional valve that is allowed to communicate with the air pressure adjusting unit 16 and used for generating a positive pressure in a space inside the sucker 410, and 602 denotes a second 2-port flow-rate proportional valve that is allowed to communicate with the air pressure adjusting unit 16 and used for generating a negative pressure in the space inside the sucker 410. Reference numeral 603 denotes an ejector that is connected to the second 2-port flow-rate proportional valve 602 and used for generating a vacuum, 604 denotes a silencer that is connected to the ejector 603, and 605 denotes a piping that connects the ejector 603, the first 2-port flow-rate proportional valve 601 and the inner space of the sucker 410 to one another.

When the first 2-port flow-rate proportional valve 601 is closed and the second 2-port flow-rate proportional valve 602 is opened, pressure-applying air is supplied to the ejector 603. In the case where the pressure-applying air is thus supplied to the ejector 603 in this manner, a negative pressure is generated on the piping 605 side by the effect of the ejector 603 when the pressure-applying air is released into the atmospheric air through the silencer 604, with the result that a negative pressure is also generated in the inner space of the sucker 410.

In contrast, when the first 2-port flow-rate proportional valve 601 is opened and the second 2-port flow-rate proportional valve 602 is closed, pressure-applying air is supplied to the inside of the sucker 410 through the piping 605 so that a positive pressure is generated in the inner space of the sucker 410.

Moreover, by controlling the degree of opening of each of the first and second 2-port flow-rate proportional valves 601 and 602, the suction force and floating force by the sucker 410 can be controlled.

Sixth Embodiment

Figure 23:
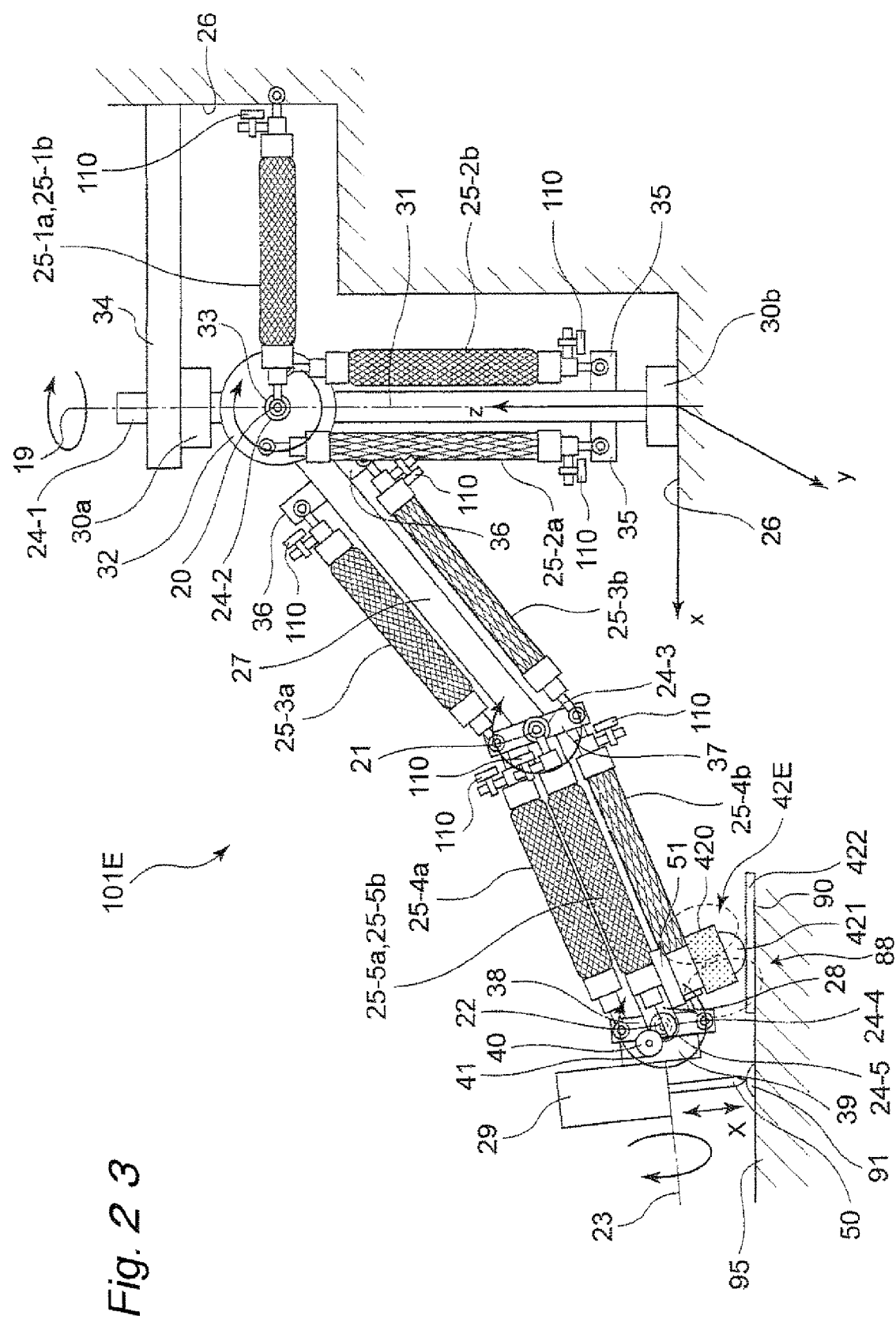
FIG. 23 is a view showing a structure of a robot arm according to a sixth embodiment of the present invention.

FIG. 23 is a view showing the structure of a robot arm 1012 according to a sixth embodiment of the present invention. The robot arm 1012 of FIG. 23 is different from the first embodiment in a structural portion to be described below, and the other portions are the same as those of the first embodiment. Therefore, those common structural portions are denoted by the same reference numerals as those of the first embodiment, and the detailed description thereof will not be given.

In FIG. 23, an arm-end supporting member 422 is formed by an electromagnet including a coil 420 and an iron core 421. By using a ground member 422 and a permanent magnet that are disposed on the supporting surface 90, a magnetic force is generated when an electric current is allowed to flow through the coil 420, and the iron core 421 is attracted onto the ground member 422 so that the arm-end portion of the robot arm 1012 can be secured thereon. In contrast, when an electric current is allowed to flow through the coil 420 in a direction opposite to the above-mentioned current, the iron core 421 and the ground member 422 repel each other, and the iron core 421 is allowed to float from the ground member 422, thereby allowing the arm-end portion of the robot arm 101E to easily move so that motions as the arm-end supporting member 42E can be carried out.

In the case where iron or the like is used as the ground member 422, by allowing an electric current to flow through the coil 420, only the attracting motion can be carried out.

Reference Example

Figure 24:
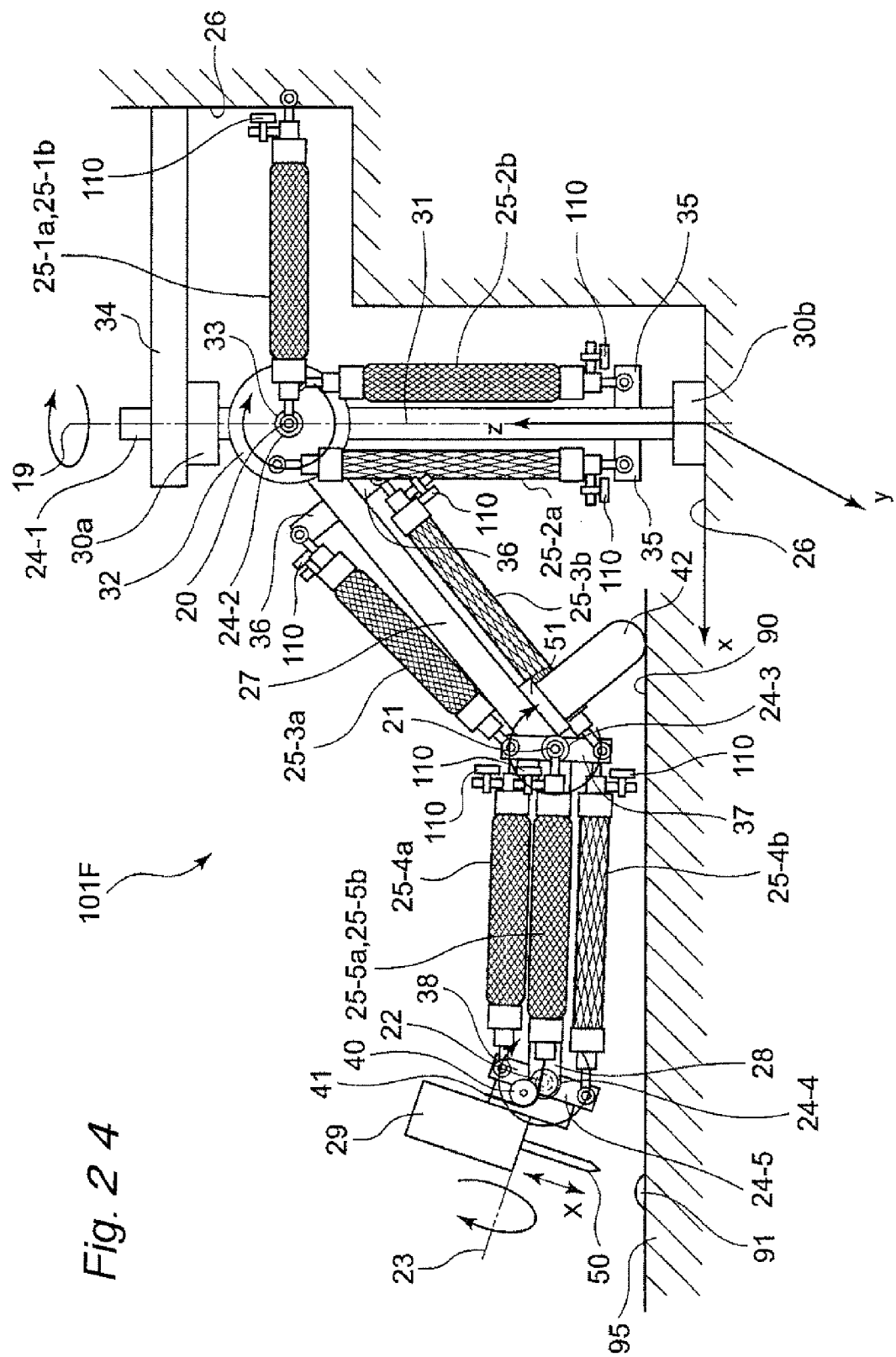
FIG. 24 is a view showing a structure of a robot arm according to a reference example.

FIG. 24 is a view showing a structure of a robot arm 101F according to a reference example. The robot arm 101F of FIG. 24 is different from the first embodiment in a structural portion to be described below, and the other portions are the same as those of the first embodiment. Therefore, those common structural portions are denoted by the same reference numerals as those of the first embodiment, and the detailed description thereof will not be given.

In the first embodiment, the arm-end supporting member 42 is secured to the second arm 28 in a manner so as to protrude downward from the tip portion thereof, with the force sensor 51 interposed therebetween. In contrast, in this reference example, the arm-end supporting member 42 is secured to the first arm 27 in a manner so as to protrude downward from the tip portion thereof, with the force sensor 51 interposed therebetween. That is, the arm-end supporting member 42 is not limited to the structure in which it is secured to the second arm 28 in a manner so as to protrude downward from the tip portion thereof, but may be attached to a link of the second joint or thereafter (for example, the third joint 73 or the fourth joint 74 or the fifth joint) from a fixed supporting point 92 of the robot arm 101. With this arrangement, the arm-end portion of the robot arm 101 can be reliably supported by the arm-end supporting member 42.

Modified Example

The above-mentioned respective embodiments have been discussed by exemplifying a screw-tightening task or a screw removing task; however, the present invention is not limited thereto, and the embodiments may be applied to another assembling task or welding task in which high precision is required such as a part-inserting task or the like, and the same effects can be obtained.

Moreover, in the second embodiment, the wheel-driving motor 48 has been installed; however, the present invention is not limited thereto, and a braking mechanism may be installed without using the motor. In the case of the braking mechanism, the friction between the wheel 46 and the supporting surface 90 can be controlled by ON/OFF of the brake, and since no motor is installed, a simple structure can be achieved.

Moreover, in the second embodiment, the wheel 46 is installed; however, the present invention is not limited thereto, and a spherical bearing may be used. In the case of the wheel 46, only the linear movement in only the direction in which the wheel 46 is allowed to rotate is available; however, in the case of the spherical bearing, two-dimensional movements are available so that it is possible to increase the degree of freedom in movements.

Moreover, in addition to the wheel 46, suction and floating mechanism by the use of air pressure, or in the case where the supporting surface 90 is made of a magnetic material, suction and floating mechanism by the use of magnetism may be utilized, and the same effects can be obtained.

Furthermore, in some of the drawings, the supporting surface 90 is illustrated as the same member or the same object as a fixed wall or a fixed portion 26 to which the robot arm is secured; however, the present invention is not limited thereto, and the surface of a member or an object that is different from the fixed wall or the fixed portion 26 may be used as the supporting surface.

Additionally, the force sensor 51 is not limited to a member that is placed between the arm-end supporting member and the arm of the robot arm, and may be installed inside the arm.

Additionally, it is needless to say that the embodiments or modified examples from the second embodiment and thereafter can exert the same functions and effects as those of the first embodiment, within a scope that is not inconsistent with the structure of each of the embodiments or modified examples, in addition to inherent functions and effects of those structures.

Moreover, among the various modes, embodiments, or modified examples, desired modes, embodiments, or modified examples may be appropriately combined so that the respective effects can be obtained.

The robot, the control device for a robot arm, and the control program for the robot arm according to the present invention can be effectively applied to a robot that assists a task while it coexists with the human being in the factory or at home, a control device for a robot arm, and a control program for the robot arm.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A robot comprising:
a robot arm that is driven by an elastic body actuator and has a plurality of joints;
an arm-end supporting member that is placed near a wrist portion of the robot arm on a base side from the wrist portion, and supports the arm-end portion of the robot arm by making in contact with a supporting surface of the robot arm; and
a control unit that controls a position and an orientation of the arm-end portion of the robot arm and controls a force by which the arm-end supporting member and the supporting surface are made in contact with each other, wherein
the control unit
(i) controls the force in a manner so as to press the arm-end supporting member onto the supporting surface to stop the position of the arm-end portion of the robot arm, and then controls the orientation of the arm-end portion, and
(ii) carries out a force control by using a pressing force that is smaller than the force controlled upon moving the orientation of the arm-end portion so that the position of the arm-end portion is shifted.

2. The robot according to claim 1, wherein the arm-end supporting member has at least two supporting legs that are expandable, and by controlling lengths of the at least two expandable supporting legs, the orientation of the arm-end portion of the robot arm is controlled.

3. The robot according to claim 1, wherein the arm-end supporting member is formed by an elastic sucker capable of being sucked or suction-released to and from the supporting surface by an air pressure, with friction between the sucker and the supporting surface being controllable.

4. The robot according to claim 1, wherein the arm-end supporting member is formed by an electromagnet capable of being sucked or suction-released to and from the supporting surface by a magnetic force, with friction between the electromagnet and the supporting surface being controlled.

5. The robot according to claim 1, wherein the arm-end supporting member is formed by a ball caster with a brake, with friction between the ball caster and the supporting surface being controlled.

6. The robot according to claim 1, wherein the arm-end supporting member is formed by a wheel with a brake, with friction between the wheel and the supporting surface being controlled separately depending on directions.

7. The robot according to claim 1, wherein the robot arm has three or more joints, and the arm-end supporting member is placed to a link of a second joint or thereafter from a fixed portion of the robot arm.

8. The robot according to claim 7, wherein the robot arm is further provided with a joint on an arm-end side from a position at which the arm-end supporting member is placed, with the joint having a degree of freedom that determines the orientation of the arm-end portion.

9. A robot comprising:
a robot arm that is driven by an elastic body actuator and has a plurality of joints;
an arm-end supporting member that is placed near a wrist portion of the robot arm on a base side from the wrist portion, and supports the arm-end portion of the robot arm by making in contact with a supporting surface of the robot arm; and a control unit that controls a force by which the arm-end supporting member and the supporting surface are made in contact with each other, and further controls a position and an orientation of the arm-end portion of the robot arm, wherein the control unit controls to decelerate an arm-end velocity of the robot arm by utilizing friction generated by the contact between the arm-end supporting member and the supporting surface.

10. The robot according to claim 1, wherein, after supporting the arm-end portion of the robot arm by making the arm-end supporting member in contact with the supporting surface of the robot arm, the control unit controls the position and the orientation of the arm-end portion of the robot arm.

11. A control device for a robot arm, which controls a robot arm that is driven by an elastic body actuator and has a plurality of joints, by making an arm-end supporting member that is placed near a wrist portion of the robot arm on a base side from the wrist portion in contact with a supporting surface so that the arm-end portion of the robot arm is supported, wherein the control device controls a position and an orientation of the arm-end portion of the robot arm and controls a force by which the arm-end supporting member and the supporting surface are made in contact with each other, (i) controls the force in a manner so as to press the arm-end supporting member onto the supporting surface to stop the position of the arm-end portion of the robot arm, and then controls the orientation of the arm-end portion, and (ii) carries out a force control by using a pressing force that is smaller than the force controlled upon moving the orientation of the arm-end portion so that the position of the arm-end portion is shifted.

12. A control program for a robot arm, which controls a robot arm that is driven by an elastic body actuator and has a plurality of joints, by making an arm-end supporting member that is placed near a wrist portion of the robot arm on a base side from the wrist portion in contact with a supporting surface so that the arm-end portion of the robot arm is supported, the control program causing a computer to:

controlling a position and an orientation of the arm-end portion of the robot arm, and controlling a force by which the arm-end supporting member and the supporting surface are made in contact with each other, (i) controlling the force in a manner so as to press the arm-end supporting member onto the supporting surface to stop the position of the arm-end portion of the robot arm, and then controlling the orientation of the arm-end portion, and (ii) carrying out a force control by using a pressing force that is smaller than the force controlled upon moving the orientation of the arm-end portion so that the position of the arm-end portion is shifted.

13. The robot according to claim 1, further comprising:

a desired trajectory generation unit that generates information relating to a position and an orientation of the arm-end portion for use in giving a control command relating to the position and the orientation of the arm-end portion to the control unit, wherein the desired trajectory generation unit determines whether or not the orientation of the arm-end portion thus generated is located within a predetermined movable range, and gives a command for controlling the orientation of the arm-end portion to the control unit when the orientation of the arm-end portion thus generated is located within the predetermined movable range, and gives a command for controlling the position of the arm-end portion to the control unit when the orientation of the arm-end portion thus generated is located out of the predetermined movable range.

14. The robot according to claim 1, wherein, when the position of the arm-end portion of the robot arm is stopped and the orientation of the arm-end portion is moved, a force-controlling motion is carried out so as to press the arm-end supporting member onto the supporting surface, and a position controlling gain of the arm-end position in a case of moving the orientation of the arm-end portion is made lower than a position controlling gain of the arm-end position in a case other than the case of moving the orientation of the arm-end portion so that position controlling rigidity is lowered.

* * * * *